United States Patent

[11] 3,620,386

| [72] | Inventors | Elbert L. Bivans;<br>August Kund, both of Glendale, Calif.; |
|---|---|---|
| [21] | Appl. No. | 9,724 |
| [22] | Filed | Feb. 9, 1970 |
| [45] | Patented | Nov. 16, 1971 |
| [73] | Assignee | Bivans Corporation, Los Angeles, Calif. |

[54] ACCUMULATOR FOR CARTONING MACHINE
6 Claims, 35 Drawing Figs.

| [52] | U.S. Cl. | 214/7, 214/6 P, 214/6 BA |
|---|---|---|
| [51] | Int. Cl. | B65g 57/00 |
| [50] | Field of Search | 214/7, 6 H, 6 K, 6 P, 6 B, 6 A; 271/87 |

[56] References Cited
UNITED STATES PATENTS

| 2,651,896 | 9/1953 | Woodruff et al. | 214/7 UX |
| 2,768,756 | 10/1956 | Horman | 214/6 H |
| 3,054,515 | 9/1962 | Nawman | 214/6 P |
| 3,080,069 | 3/1963 | Euwe | 214/7 X |
| 3,219,203 | 11/1965 | Jeremiah | 214/6 H |
| 3,245,557 | 4/1966 | Maramonte et al. | 214/6 P |
| 3,392,852 | 7/1968 | Tegner | 214/6 P |
| 3,402,832 | 9/1968 | Wehde | 214/6 B |
| 3,429,459 | 2/1969 | Paul et al. | 214/6 DK |
| 3,477,201 | 11/1969 | Small | 214/6 H X |
| 2,586,172 | 2/1952 | Murphy | 214/7 |
| 3,272,352 | 9/1966 | Adams et al. | 214/7 |

Primary Examiner—Gerald M. Forlenza
Assistant Examiner—Robert J. Spar
Attorney—William E. Beatty ABSTRACT: Automatic cartoning machine including twin cartoning units mounted in a common framework having a conveyor for conveying a stack of paper cups or other article for each unit. The units are similar having their loading stations adjacent each other to receive the articles. Each unit has a plurality of cams making one complete revolution for one cycle of operation. Each cycle includes removing a collapsed glue end carton from the bottom of a magazine, transferring it to a combined loading and squaring-up station where the carton is squared up and the article is loaded into the carton. The cycle is started by arrival of the article at a station and is terminated by one complete revolution of the cams. The minor flaps pass through a glue applicator on the way to the station. After the flaps are partially sealed, the carton is elevated through a compression chute and the filled and sealed carton is then ejected horizontally and guided to fall in upright position in front of an accumulator which operates in timed relation with the supply of filled and sealed cartons and with the transfer of the article from the conveyor to a loading tray. Cam means controls supply of the upright cartons to a row former, a given carton pushing on the cartons ahead of it until the row is filled, the leading carton controlling a trigger to complete a power drive to eject the row as a unit, the individual cartons and the rows leaning downhill to form a compact group of rows of upright elongated cartons.

PATENTED NOV 16 1971 3,620,386

INVENTORS.
ELBERT L. BIVANS
AUGUST KUND
BY W.E. Beatty
ATTORNEY

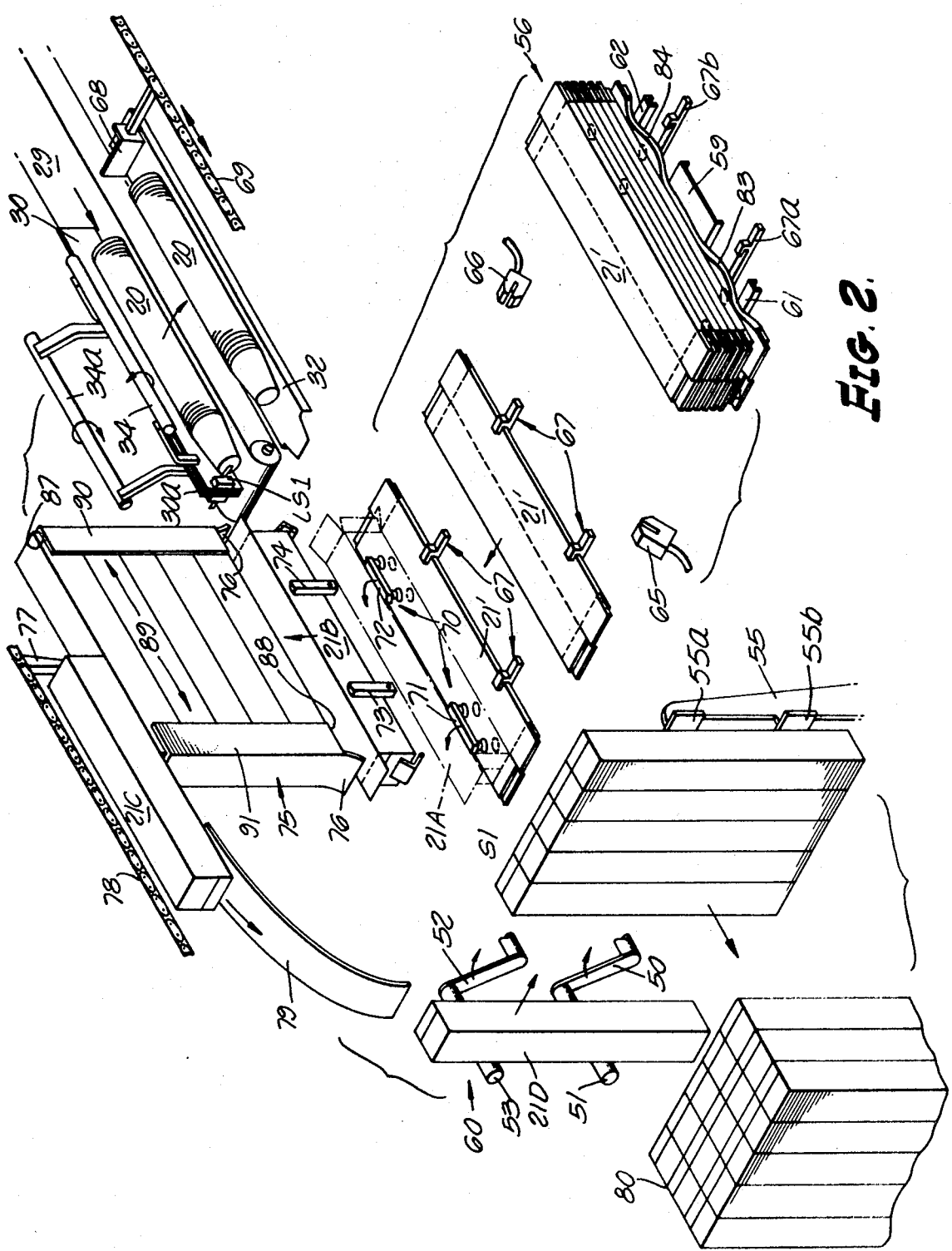

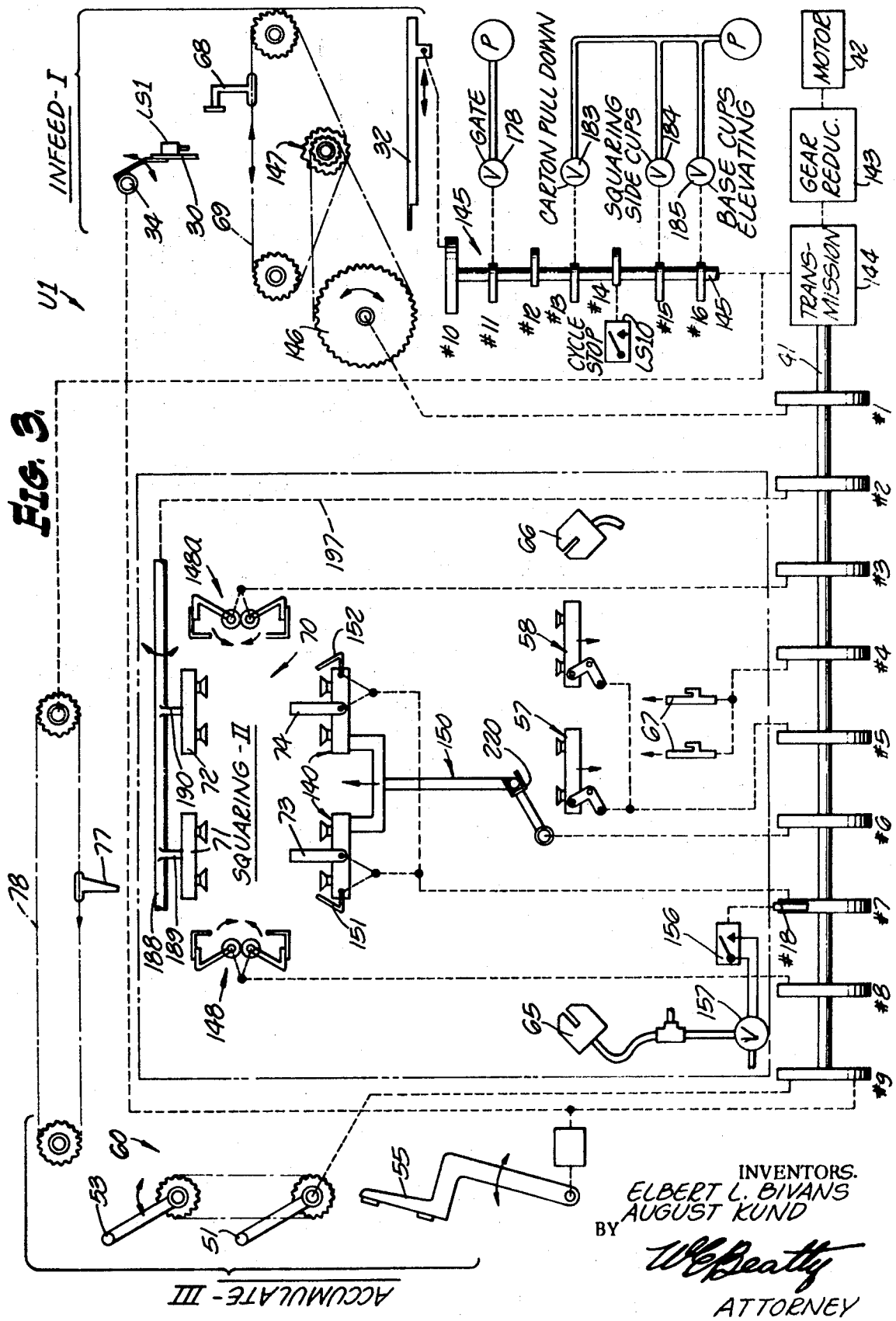

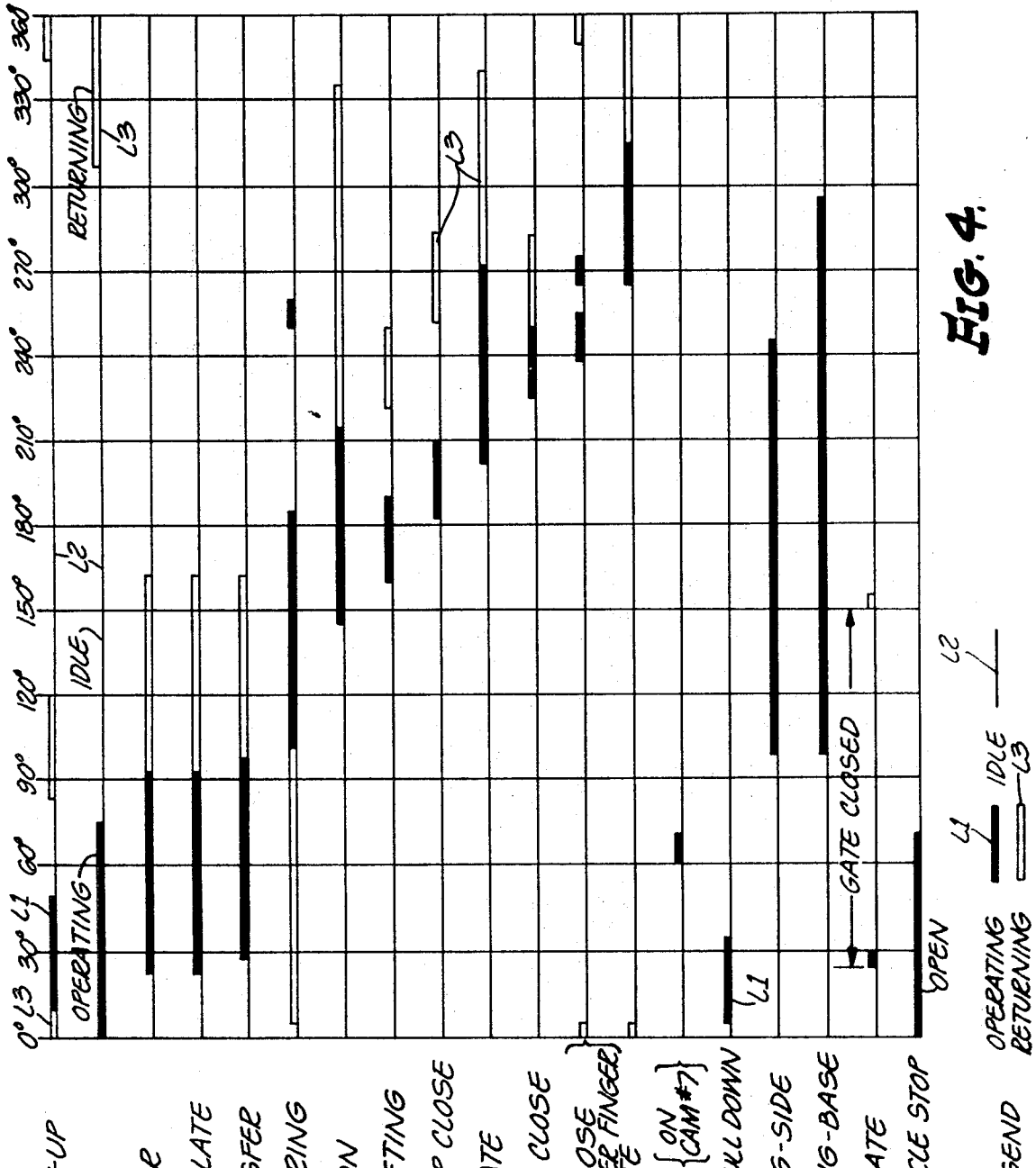

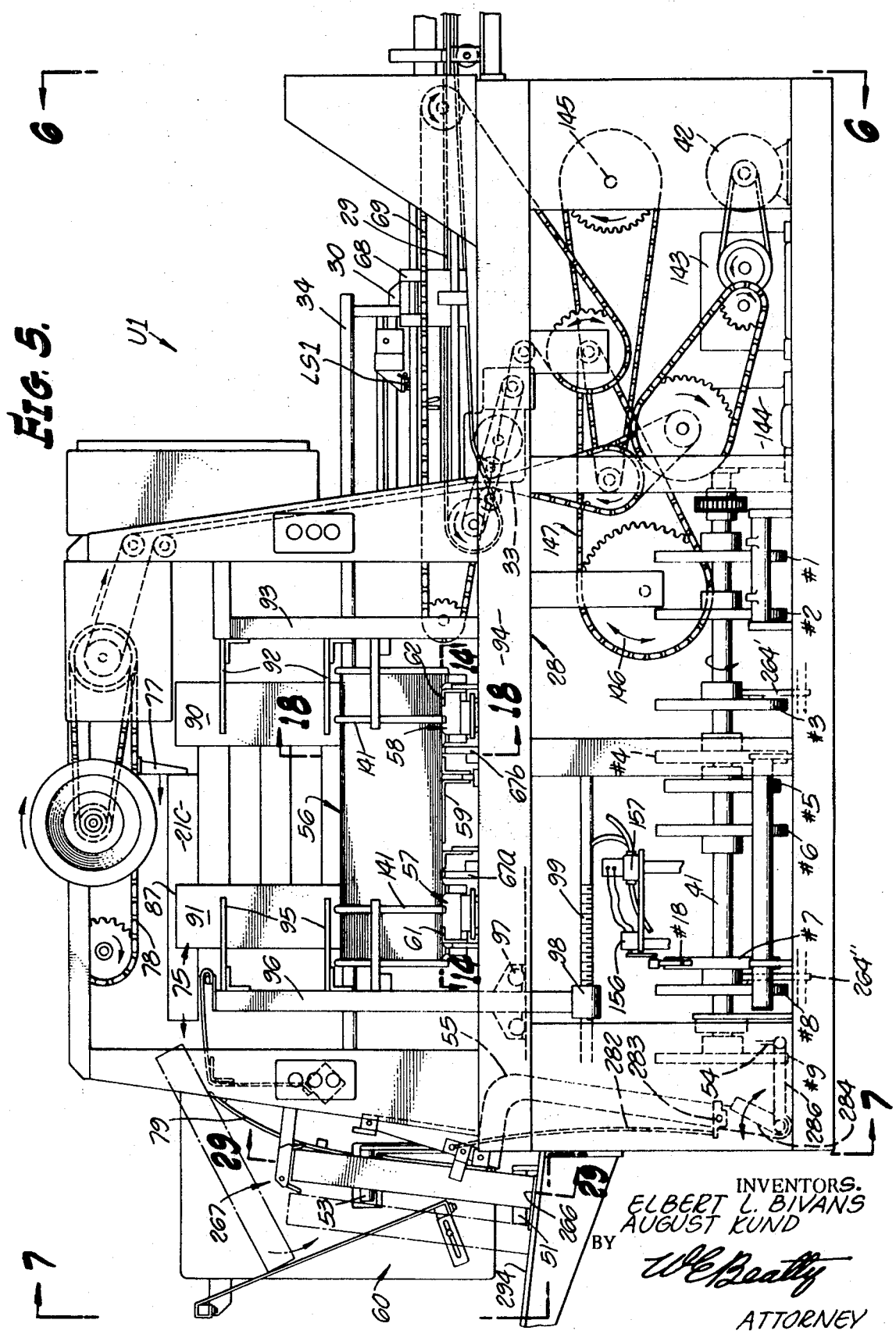

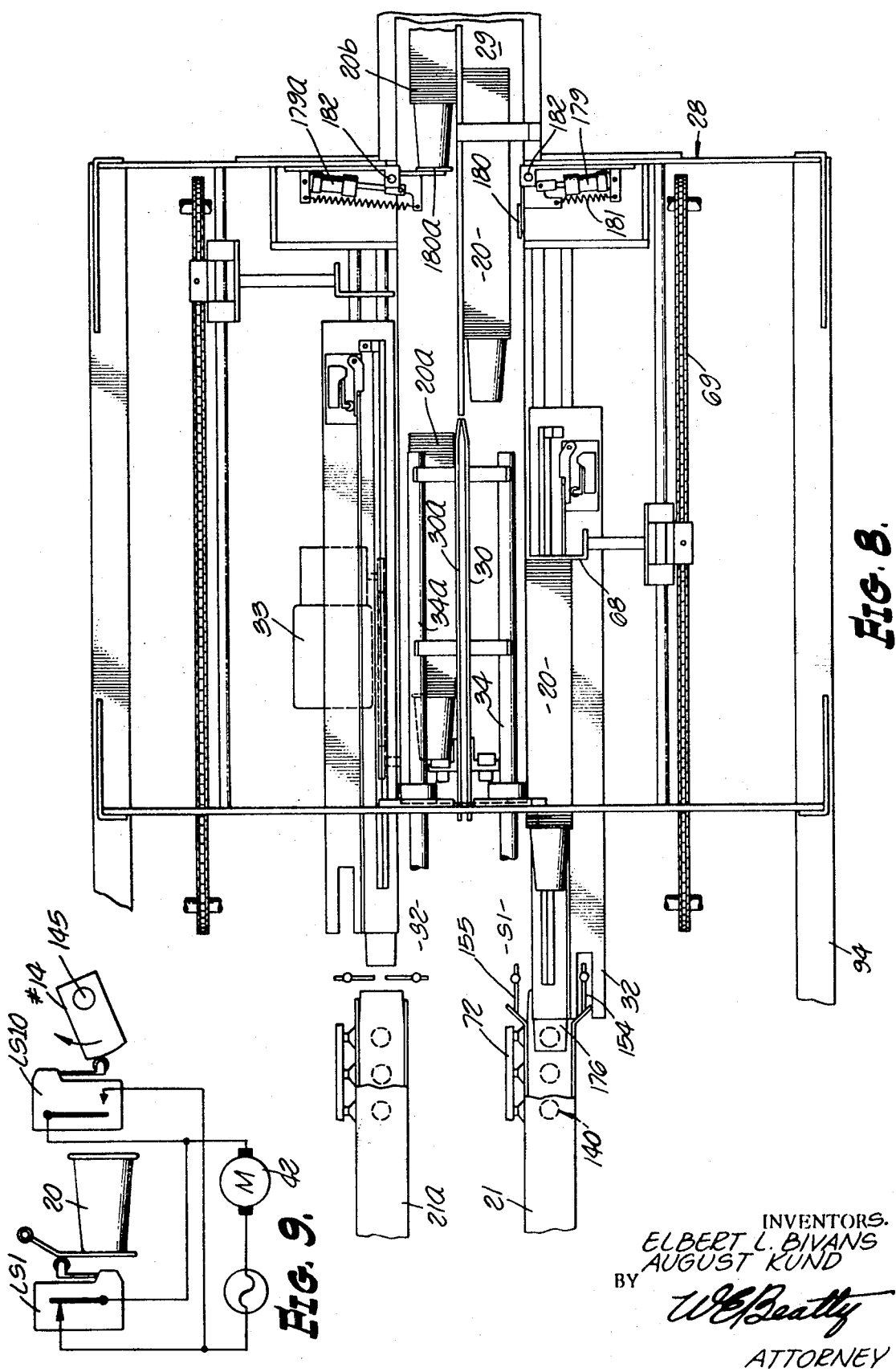

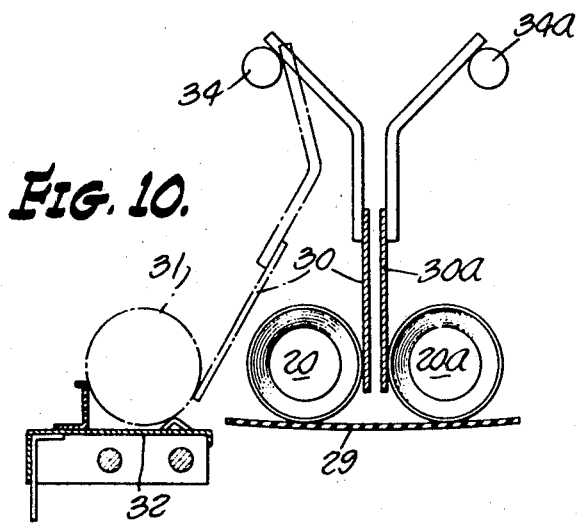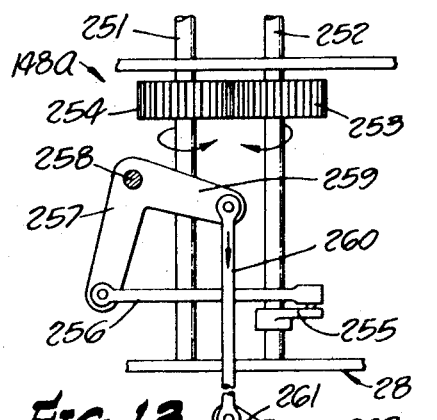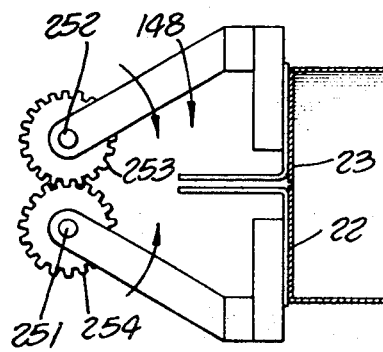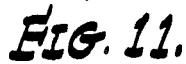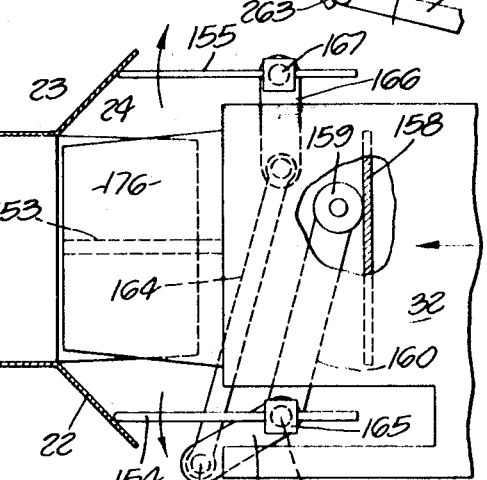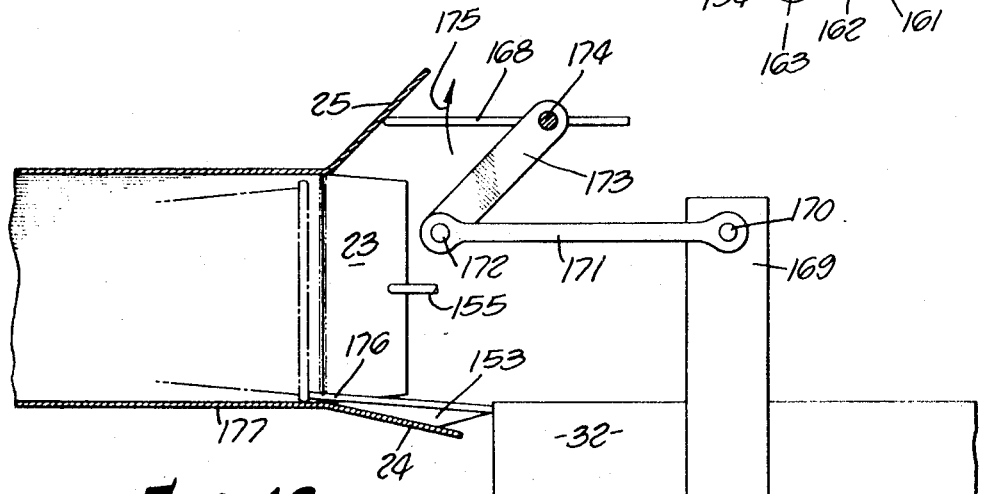

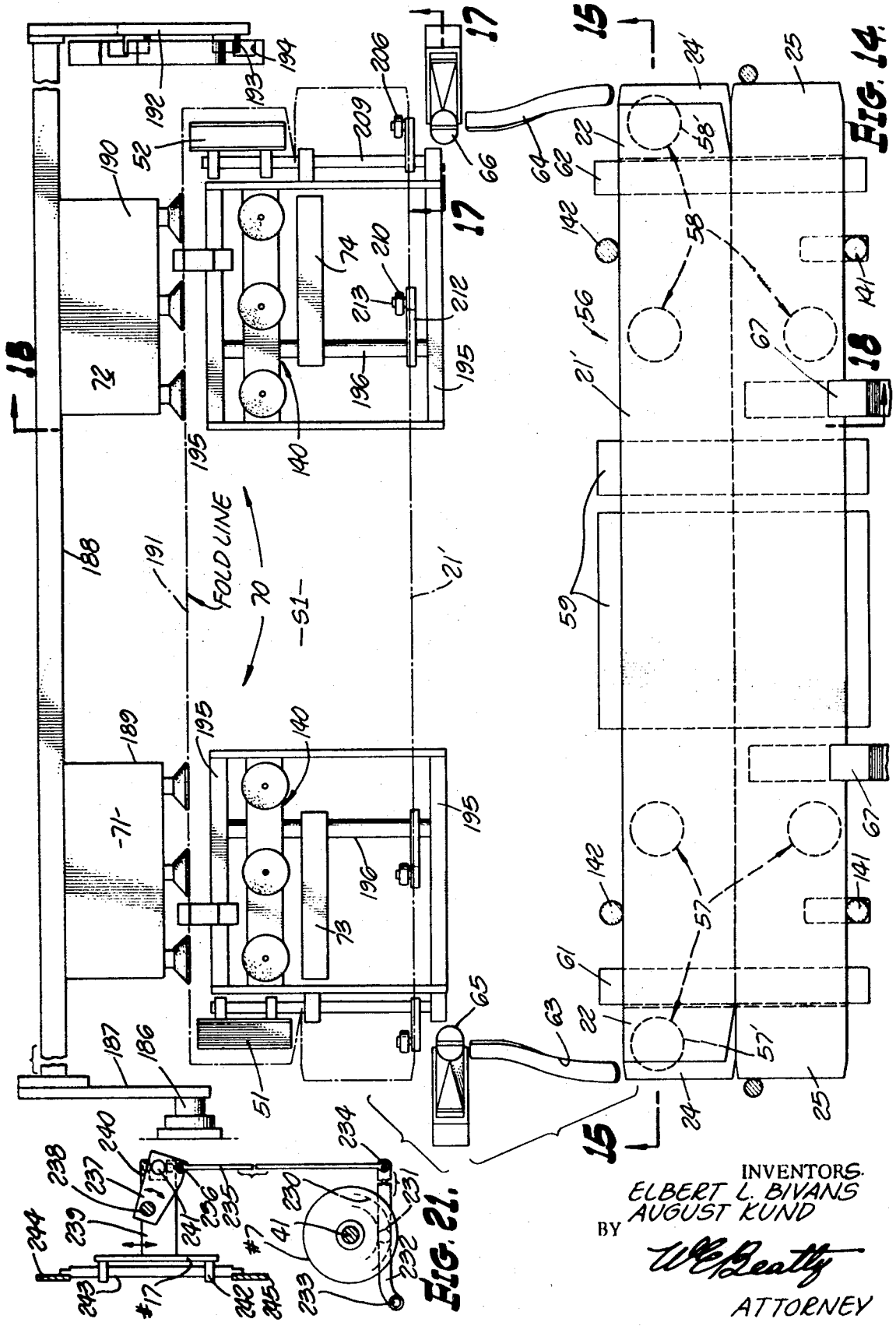

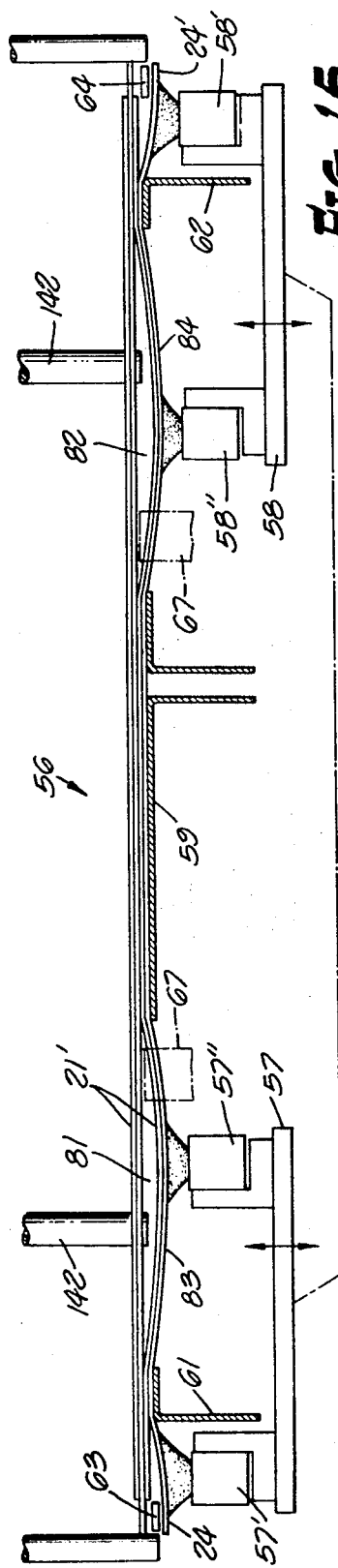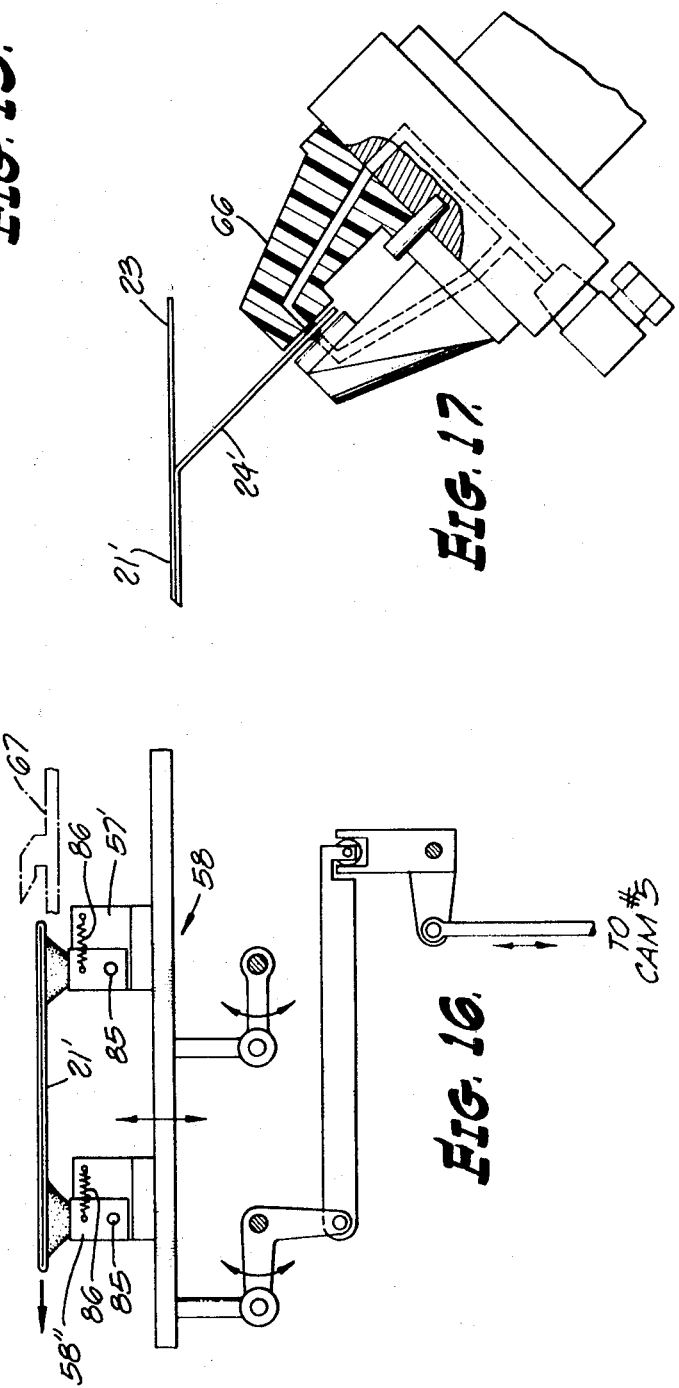

INVENTORS.
ELBERT L. BIVANS
AUGUST KUND
BY
W. E. Beatty
ATTORNEY

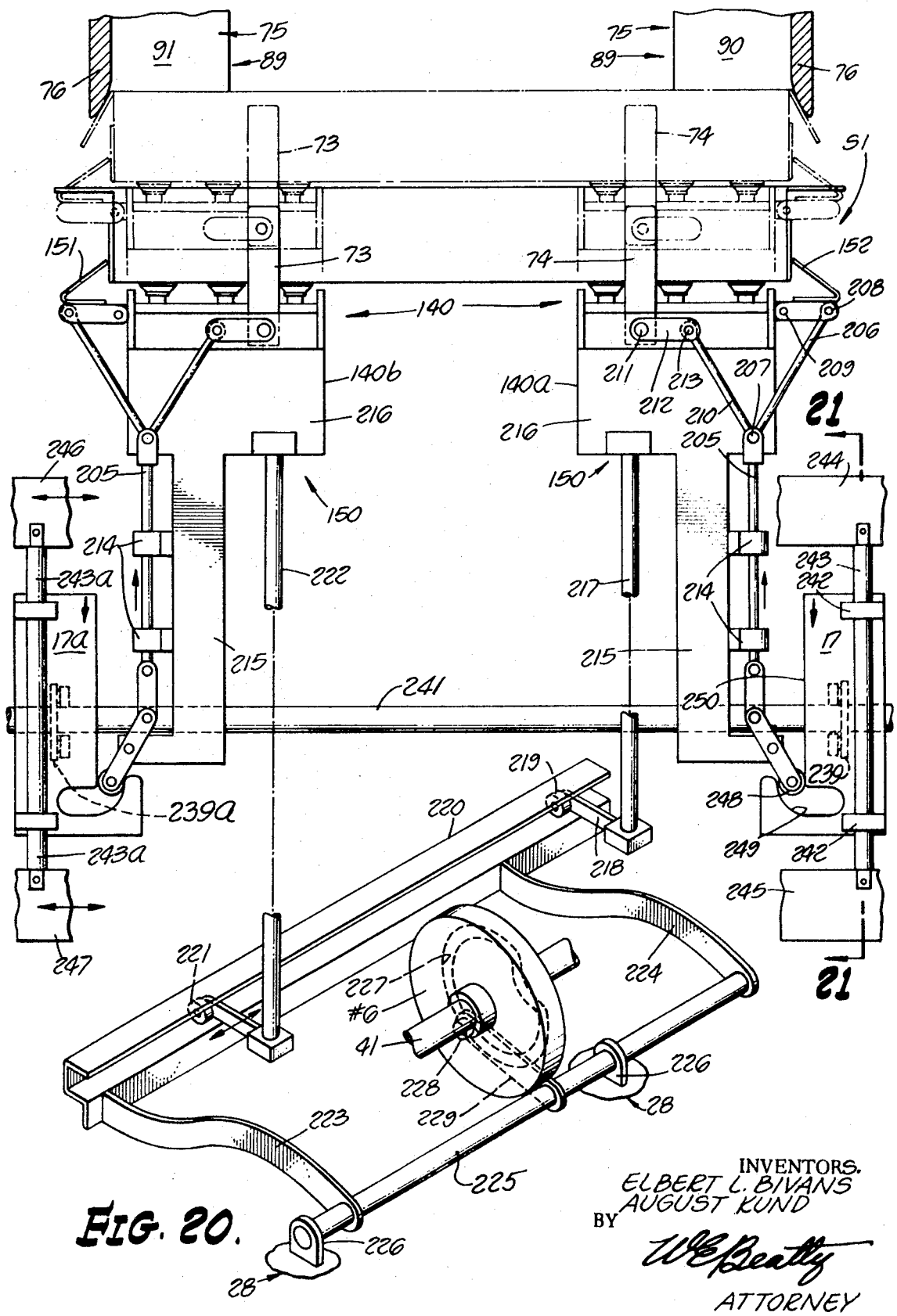

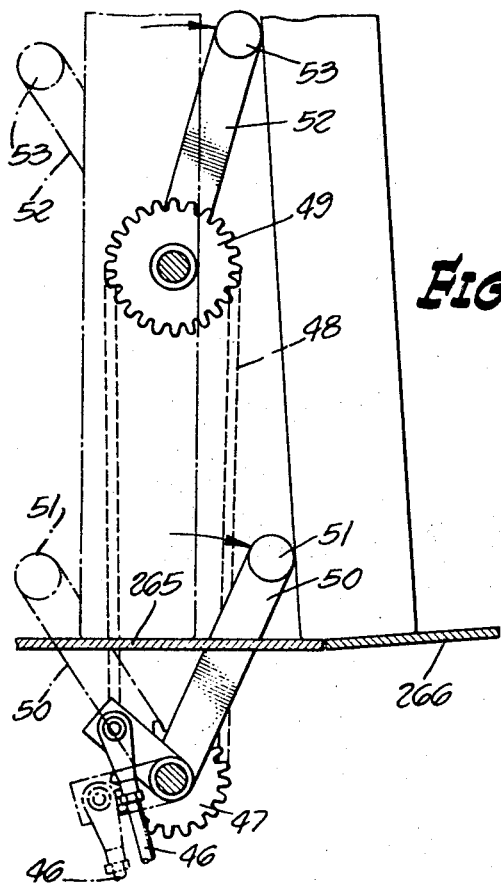
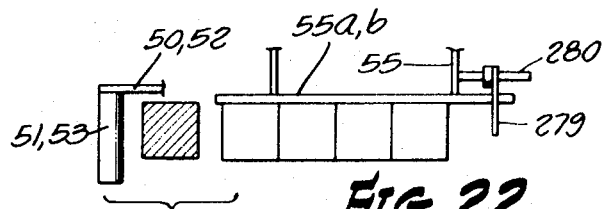
FIG. 22.
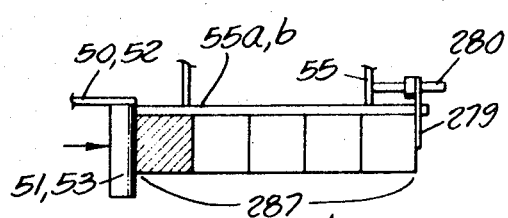
FIG. 23.
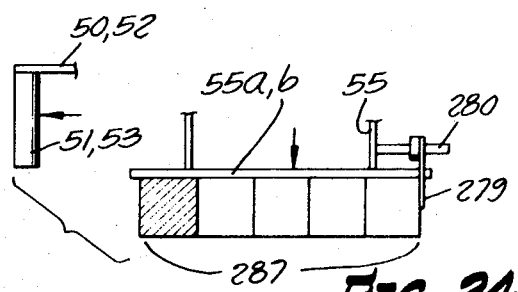
FIG. 24.
FIG. 25.
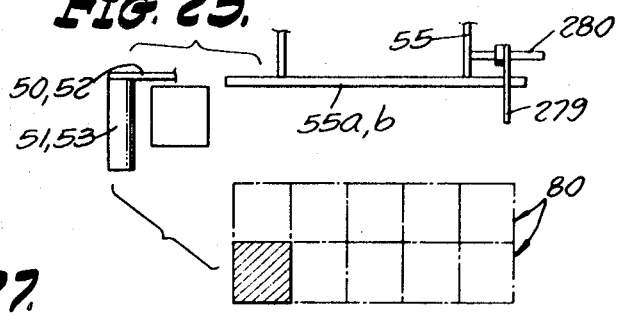
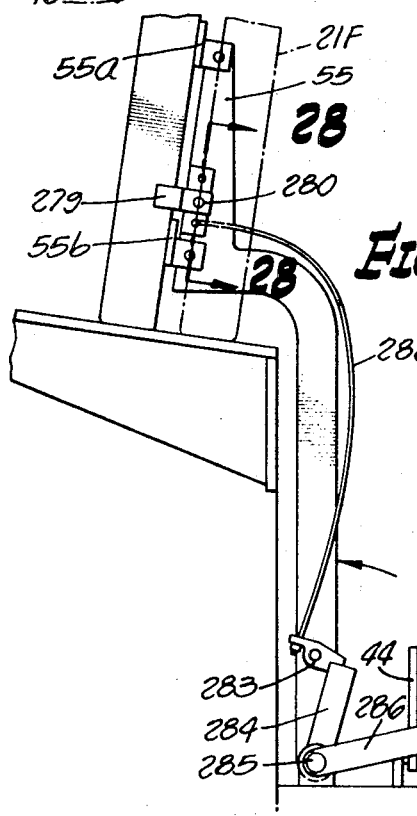
FIG. 27.
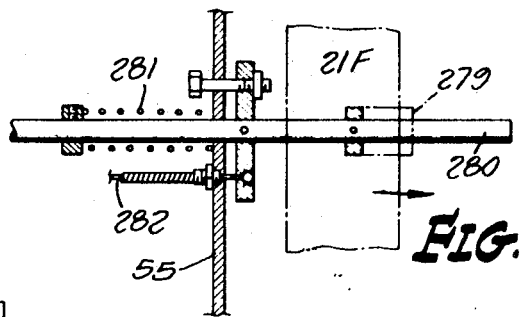
FIG. 28.
INVENTORS.
ELBERT L. BIVANS
AUGUST KUND
BY
W. E. Beatty
ATTORNEY INVENTORS.
ELBERT L. BIVANS
AUGUST KUND
BY
W.E. Beatty
ATTORNEY 3,620,386

ACCUMULATOR FOR CARTONING MACHINE

CROSS-REFERENCE TO RELATED APPLICATION

The present case claims the accumulator for accumulating upright filled cartons in a bundle. The accumulator in combination with the cartoning operation of squaring up, loading or filling and sealing the carton, for one cartoning unit or for twin units having a common conveyor for the articles to be inserted in the cartons is described and claimed in copending application Ser. No. 9,738, filed Feb. 9, 1970 by applicants for AUTOMATIC CARTONING MACHINE FOR GLUE END CARTON.

BACKGROUND OF THE INVENTION

1. Field of the Invention

Accumulator for stacking upright elongated filled cartons in a row and for stacking the rows together to form a bundle.

2. Description of the Prior Art

The prior art includes a number of U.S. patents owned by the assignee hereof as well as patents to others, disclosing cartoning machines, e.g. Kucklinsky et al. No. 2,916,974, Dec. 15, 1959; Jones No. 2,133,248, Oct. 11, 1938; Bivans No. 3,432,984, Mar. 18, 1969, Bivans No. 3,373,665, Mar. 19, 1968; Bivans No. 2,682,209, June 29, 1954; Engleson et al. No. 3,074,326, Jan. 22, 1963, So far as known, none of the prior patents disclose the following features listed under the next heading.

SUMMARY OF THE INVENTION

Accumulator for longitudinally stacking upright elongated sealed and filled cartons in a row and for stacking the rows together to form a compact group of rows. The cartons are fed upright step-by-step to a row former in timed relation with the row and group formation. The completion of a row operates a trigger to laterally eject the row out of the row former to laterally stack the rows together and put the row former in condition to accept other cartons to form the next row. The cartons are individually received in upright position and are advanced step-by-step in tilted position to extend upright with respect to a tilted base for the row former. The tilt causes the cartons to hug together in compact form. A similar tilt is provided for the base on which the rows are ejected to compact the rows and form a compact group of the rows of upright cartons, which are preferably square in cross section. The row former has a carton inlet having a catch to prevent the cartons from falling back out of the former. The row former also has a row outlet having a catch to prevent an ejected row from reentering the row former.

BRIEF DESCRIPTION OF THE DRAWINGS

FIG. 2 is a schematic perspective view with parts broken away showing one unit of a twin unit cartoning machine for loading the cups in the cartons with an accumulator for the filled and sealed cartons.

FIG. 3 is a schematic view showing the motor drive for the cam shafts having a total of 17 cams, this figure indicating the element controlled by each cam. This figure consists of three main sections, INFEED-I, SQUARING-II, ACCUMULATING-III.

FIG. 4 is a timing chart for the various cams.

FIG. 5 is a side view in elevation of the left-hand one of two cartoning units, considering that the right-hand side of FIG. 1 is the inlet, the cups or similar article being supplied at the front of the machine as also appears in FIG. 2. This view shows cams #1 to #9 as indicated on FIG. 2, but does not show the cam followers or driven mechanical connections for these cams.

FIG. 8 is a plan view of the inlet end of both units showing one conveyor which serves both units.

FIG. 9 is a schematic circuit showing the article control for starting the motor at the start of a cycle. This cycle corresponds to one rotation of the cam shaft which has a cam for stopping the motor at the end of the cycle.

FIG. 10 is a enlarged view in vertical section showing cross transfer arms for transferring the stack of cups from a conveyor to one unit indicated or to the twin unit not indicated.

FIG. 11 is a schematic view showing the dust or side flap closures in position to act as a stop at the time that the loading tray is advanced to hold the flaps open at the other end of the carton to facilitate entry of the cups.

FIG. 12 is a vertical sectional view with parts broken away showing the cup tray in position at the outer end of the carton.

FIG. 13 is a detail of the mechanism for operating the dust flap closures, this apparatus being the same for both ends of the carton but being operated at different times by different cams.

FIG. 14 is a plan view on line 14—14 of FIG. 5 looking in the direction of the arrows and showing a collapsed carton in a magazine ready to be transferred to a squaring-up station.

FIG. 15 is a sectional view on line 15—15 of FIG. 14 showing the carton and lowermost flap pulled down.

FIG. 16 is a schematic side view in elevation showing the collapsed carton pulled down from the magazine in position for engagement by a shuttle.

FIG. 17 is an enlarged view on line 17—17 of FIG. 14, partly in section, showing the minor flap at one end of the carton in position to pass through a glue applicator for applying glue to opposite sides thereof, a similar applicator indicated in FIG. 14 being provided for the minor flap at the other end of the carton.

FIG. 20 is a side view in elevation with parts broken away showing the two elevator members which feed the filled carton into the lower end of a compression chute leading to the accumulator, with their common adjustable elevator cam drive and also the sliding cam for driving the minor flap tucker at the inner end of the carton and support arms, cam #6 being rotated 90° out of its true plane, the sliding pivotal connection permitting longitudinal adjustment of the two elevator members to suit cartons of different lengths.

FIG. 21 is a sectional view on line 21—21 of FIG. 20 showing a rotary cam for operating the above-mentioned reciprocating cam.

FIGS. 22, 23 and 24 are schematic plan views which illustrate the accumulation of the upright filled cartons in a row, and FIG. 25 is a schematic plan view which illustrates the step-by-step advance of the filled rows to form a bundle.

FIG. 26 is a vertical sectional view showing cross transfer arms wherein the lower one has a greater range of movement than the upper one to shift the upright carton from a vertical position on a horizontal platform to a tilted position upright with respect to a tilted extension of the platform.

FIG. 27 is a side view in elevation showing the accumulator mechanism for advancing a row of filled cartons.

FIG. 28 is an enlarged sectional view on line 28—28 of FIG. 27 showing the trigger finger operated by the leading carton when a row is filled to advance the row.

DESCRIPTION OF THE PREFERRED EMBODIMENT

Figure 1A:
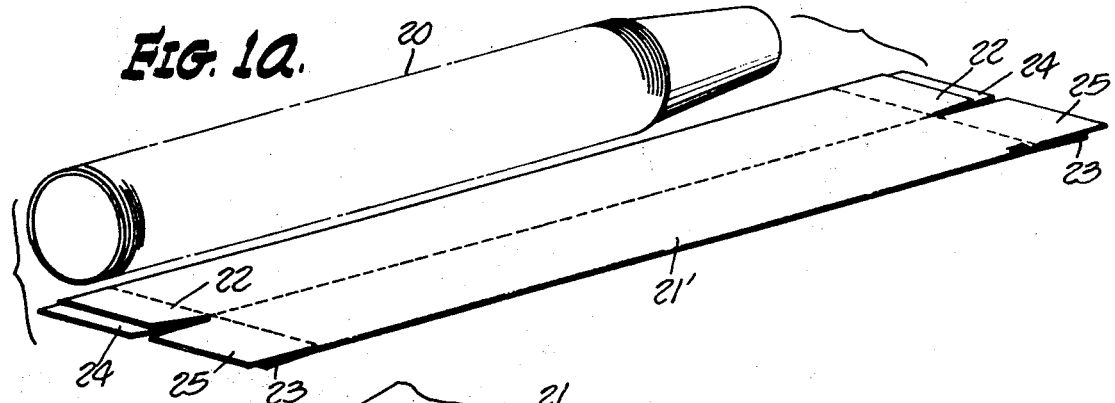
FIG. 1a is a perspective view of an article consisting of an elongated stack of paper cups to be loaded into a carton, this figure showing the carton in collapsed form.

Referring to the drawings, FIG. 1a shows a stack of paper cups indicated at 20, typical of a desired article to be inserted into the carton. The stack 20, in fact, may be from 50 to 100 cups, and this stack is the preferred type of article to be loaded or packed into a carton indicated at 21' in collapsed form. The carton is identified by reference number 21 in FIGS. 1b and 1c with its flaps 22 to 25 open. When the cup stack 20 is being inserted in the outer end of the carton as shown in FIG. 1c, the dust flaps like 22 and 23 are closed at the opposite end, this condition of the carton being indicated by reference number 21A, see FIG. 1d. When the minor flap like 24 is closed at both ends of the carton, this condition is indicated by reference number 21B, see FIG. 1e. When all the flaps at both ends are closed with the contents 20 in the carton, this condition is indicated by reference number 21C as shown in FIG. 1f. For example, the carton may be from 17 inches to 27 inches long and from 1¾ inches square to 4 inches square. The cartoning machines disclosed herein are adjustable to accommodate these dimensions.

Figure 1B:
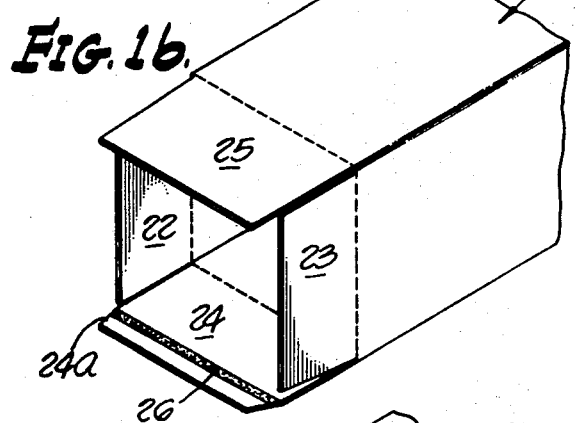
FIGS. 1b to 1f are perspective views of one end of the carton showing the flaps in various positions.
Figure 1E:
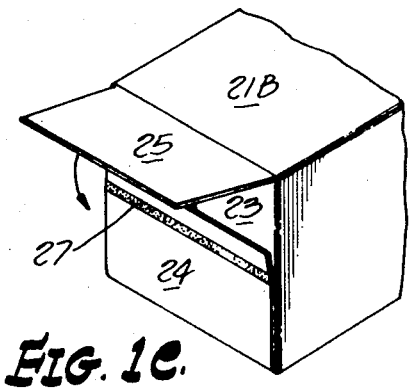
Figure 1C:
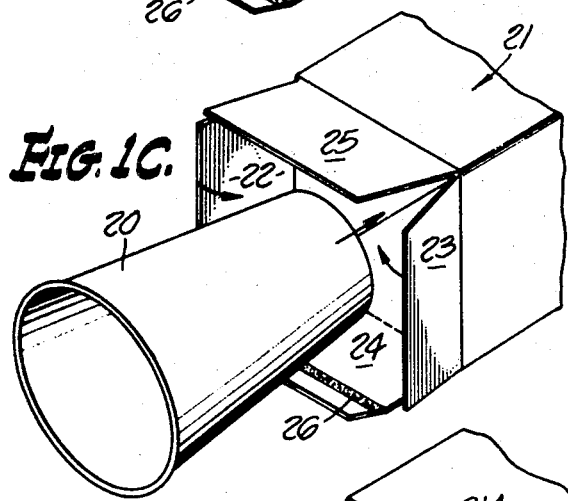
Figure 1F:
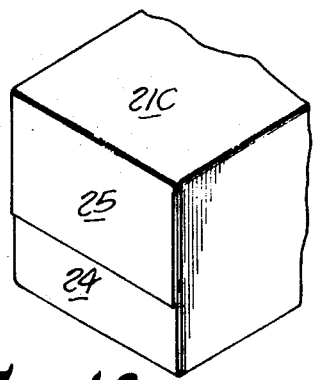
Figure 1D:
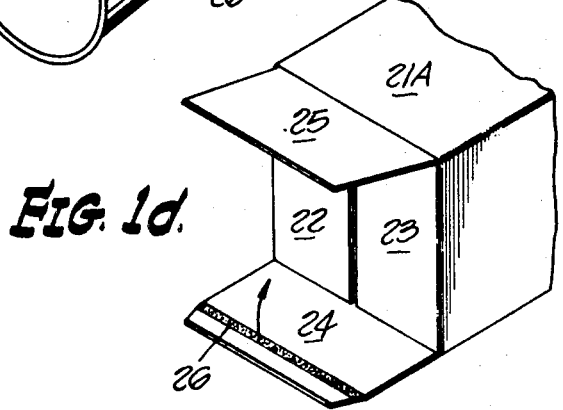

The carton 21 is a standard four-flap glue-up carton and has four panels mutually at right angles when the carton is open or squared up as shown in FIG. 1b. The carton 21 has side or dust flaps indicated at 22 and 23, a lower or minor flap 24 and a major flap 25, these flaps being provided at opposite ends of the carton. Glue is applied to the lines or strips indicated at 26 on the inside of minor flap 24 and on the directly opposite line 27 on the outside of flap 24 whereby on first closing the dust flaps like 22 and 23 to abut, as shown in FIG. 1d, later closing of minor flap like 24, as shown in FIG. 1e, adheres it to the dust flaps, and final closing of the overlapping major flap like 25, as shown in FIG. 1f, seals it to flap 24. When the carton is collapsed as shown at 21', the end of minor flap 24 extends beyond the outer end of dust flap 22 as indicated at 24a, and the glue strips 26 and 27 are applied to this extension in position so that strip 26 will not be contacted by the lug 153 on the loading tray 32 in FIG. 12 or by the side flap openers 154 and 155, FIG. 11. One of the strip 27 will not be contacted by the flap closures at either end of the carton.

FIG. 1c illustrates that the carton 21 is in horizontal position at the time that the stack 20 is inserted lengthwise into the carton.

The article to be inserted in the carton may be of some other nature than a stack of paper cups.

Figure 6:
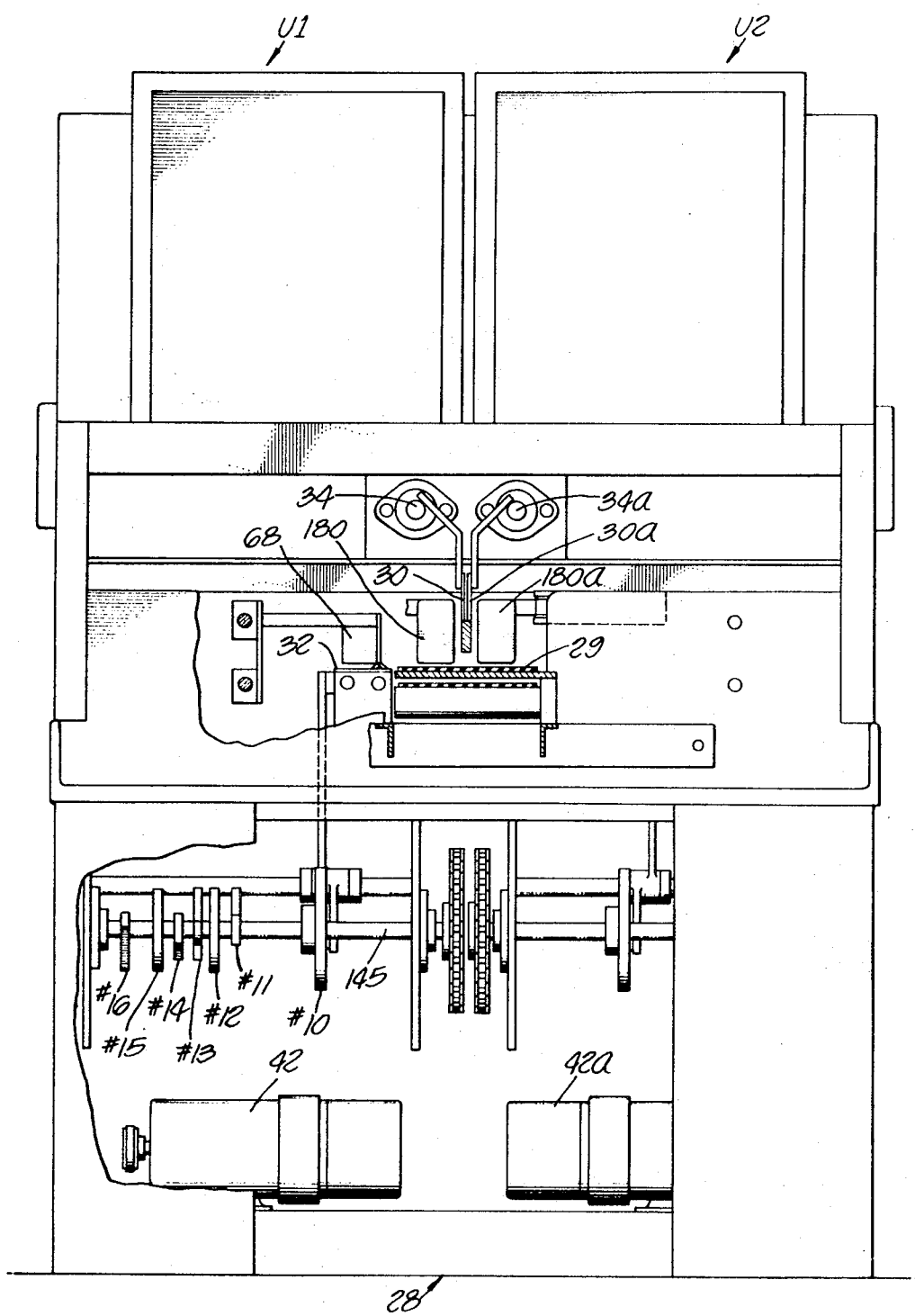
FIG. 6 is a front elevation looking in the direction of the arrows on line 6—6 in FIG. 5. The cams shown here correspond to the cams #10 to #16 in FIG. 3. In the drawings, the unit on the left side is shown in detail, the unit on the right side being exactly the same except for cam 4 and its operated drive which is different because of the different traverse of the shuttle which picks up the flat carton.
Figure 7:
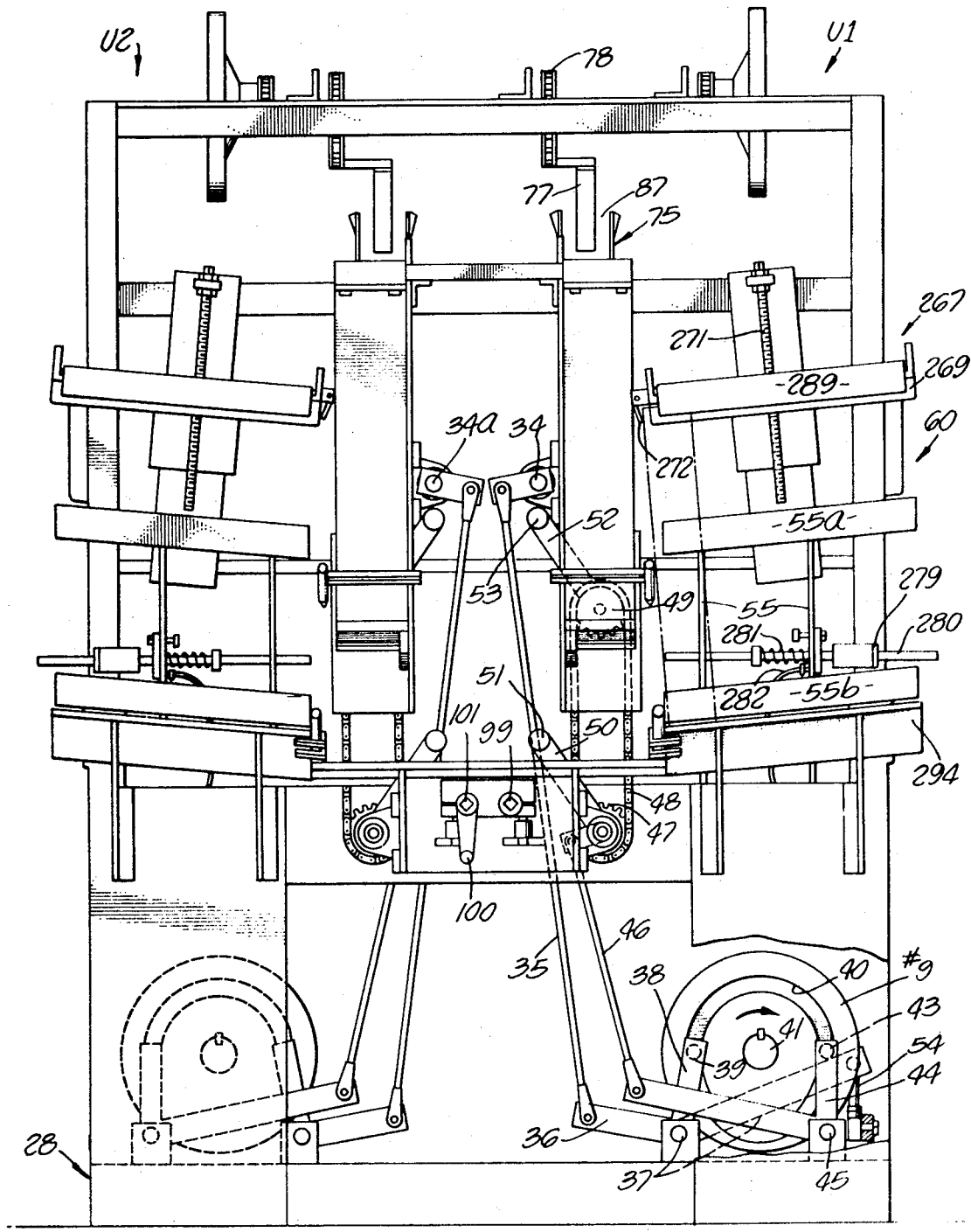
FIG. 7 is a rear view in elevation, the left unit being shown on the right-hand side of the figure, looking in the direction of the arrows on line 7—7 in FIG. 5.

The invention provides a twin automatic cartoning machine having a common framework indicated at 28 in FIGS. 5, 6 and 7, the unit on the left U1 appearing in side elevation in FIG. 5 and a rear elevation in FIG. 7 showing the unit U1 on the right-hand side and the similar unit U2 on the left-hand side. Each unit is complete with its motor, cam drive and cartoning mechanism all as shown schematically in FIG. 3 which details the unit U1. FIG. 6 is a front view of the twin machine, the view being taken in the direction of the arrows on line 6—6 of FIG. 5, the unit U1 appearing on the left and the similar unit U2 appearing on the right. These two units U1 and U2 have a combined operation in that their inlets or loading stations S1 and S2 as shown in FIG. 8, where the cup stacks 20 and 20a respectively are loaded into their respective cartons, are arranged adjacent to each other and the cup stacks 20 and 20a are conveyed by one continuously operating conveyor belt 29 as shown in FIG. 10. Conveyor belt 29 is suitably driven by motor 33, FIG. 8. Each of the units U1 and U2 has a cross transfer arm, arm 30 being provided for transferring the stack 20 laterally in one direction to the position shown at 31 to be received by a loading tray 32, the similar arm 30a for the other unit being actuated in the opposite direction to laterally transfer the stack 20a from the conveyor 29 to a tray like 32 not shown for the companion unit. Arm 30 is mounted on an oscillating shaft 34, and arm 30a is mounted on shaft 34a. These shafts are shown in FIG. 7. Shaft 34 is oscillated by a link connection 35 to a crank 36 having a pivotal support at 37 in the form of a rock shaft and an arm 38 having a cam follower 39 in the cam groove 40 of cam #9 mounted on the main cam shaft 41 driven by motor 42, FIGS. 3 and 5. The cam groove 40 of cam #9 also has a cam follower 43 which operates a crank 44 having a pivotal support 45, the crank operating link 46 to oscillate sprocket 47 to reciprocate chain 48 and oscillate idle sprocket 49. Sprocket 47 carries an arm 50 having a cross transfer arm 51 of the accumulator 60, and sprocket 49 has an arm 52 having a companion arm 53. Sprocket 47 is smaller than sprocket 49 for a reason explained later. Rock shaft 37 also at the rear of cam #9, as seen in FIG. 7, rocks lever arm 54 to provide power for actuating the row pusher 55 having cross arms 55a and 55b of the accumulator 60, see FIG. 3, when a row of filled cartons has been accumulated.

Referring to FIG. 2, the collapsed cartons 21' are stacked in horizontal position in a suitable magazine 56, see FIGS. 14, 15 and 16, which permits their withdrawal one at a time by a suction head device 57 at one end of the carton and a similar device 58 at the other end of the carton as shown in FIG. 15. In being thus pulled down, the collapsed carton 21' is lowered to rest on a support 59. The outer end member 61 of support 59 is spaced from the similar member 62 at the other end of the carton by a length corresponding to the length of a carton panel so that the minor flap 24 projects outwardly beyond the support member 61 at one end and the minor flap 24' projects outwardly beyond support member 62 at the other end. The reason for this is that suction head member 57' pulls flap 24 down below a track 63, see also FIG. 14, the outer end of minor flap 24' in being pulled down by suction head member 58' is similarly pulled down below track 64, the tracks 63 and 64 guiding their respective minor flaps 24 and 24' through glue applicators 65 and 66 for applying glue as indicated at 26 and 27 in FIGS. 1b and 1e to the opposite sides of the respective minor flaps in the course of travel of the collapsed carton 21' from its position below magazine 56 to the combined squaring-up and loading station S1 shown also in FIG. 8.

The carton support 59 also has a gap 81 above the suction head member 57" and a similar gap 82 above the suction head member 58" so that these suction heads will buckle the portion of the carton indicated at 83 and 84 between their respective supports to facilitate entry of the members of shuttle 67, as shown in FIG. 2 and 15.

Figure 18:
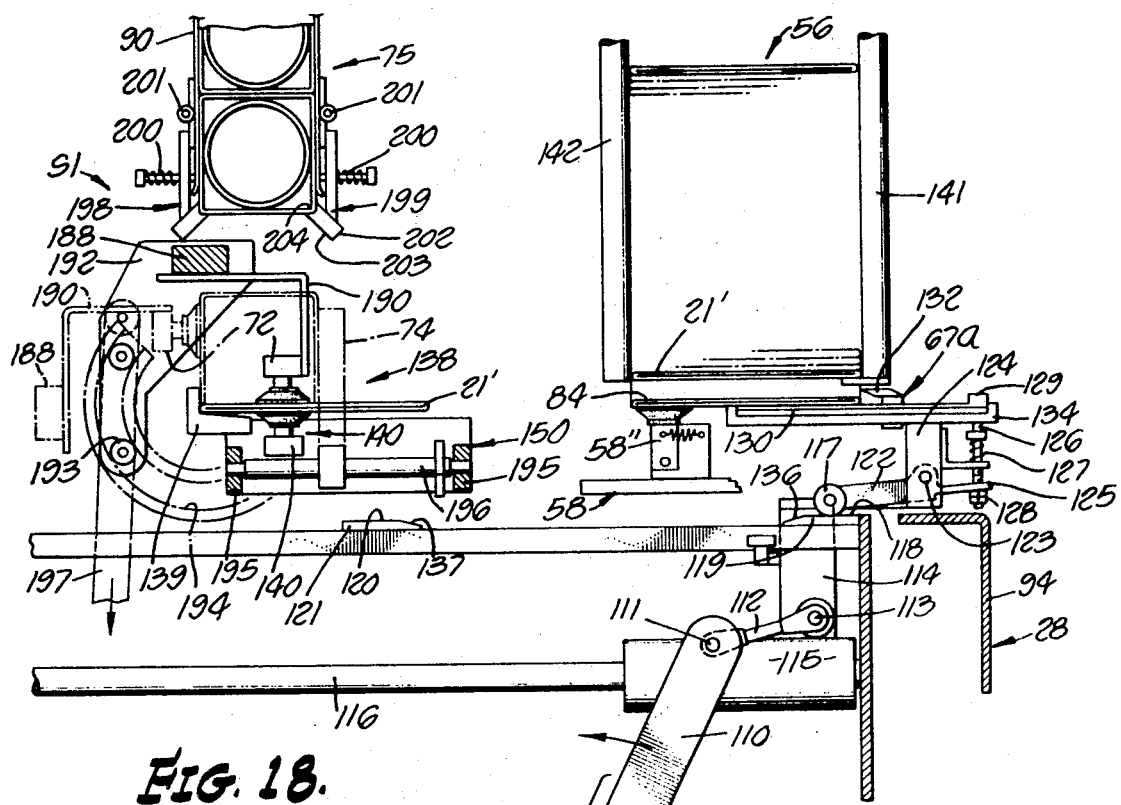
FIG. 18 is an enlarged vertical sectional view on line 18—18 of FIGS. 5 and 14 showing cam #4 and mechanism operated thereby for operating one of the two shuttle members, the other one being similar, adjustable lengthwise to suit cartons of different lengths by reason of a sliding pivotal connection, and both members being driven by the same #4 which is rotated about a vertical axis 90° from its true plane shown in FIG. 3. This figure also illustrates a chute for receiving the loaded cartons.

Details of the shuttle 67 are shown in FIG. 18. See also FIG. 2, wherein the shuttle 67 is in the form of two similar members 67a and 67b, the former engaging the bulge 83 and 67b engaging the bulge 84, these bulges being portions of the collapsed carton 21' bulged by the suction heads 57" and 58" as shown in FIG. 15. One of the shuttle members such as 67a is shown in detail FIGS. 18 and 19 wherein the shuttle is reciprocated between the magazine 56 and the combined squaring-up and loading station S1, by means of cam #4. Cam #4 has a groove 102 for a cam follower 103 which operates a lever 104 having a pivotal support at 105, the outer end of the lever having a U channel 106 forming a slidable pivotal connection with a roller 107 at the outer end of a crank lever 108 pivotally connected at 111 to a link 112 pivotally connected at 113 to a shuttle carriage 114. The carriage 114 includes a hollow cylindrical slide bearing 115 which slides on the fixed shaft 116. The shuttle member 67a has a cam roller 117 which holds the shuttle open in the position shown in FIG. 18 when the cam roller 117 is on the land 118 of a stationary cam 119, in position to engage the edge of the flat carton 21', and also open when cam roller 117 is on the land or raised portion 120 of a reverse cam 121 when the carton has been deposited at the combined loading and squaring-up station S1. The cam roller 117 is mounted on the outer end of a lever 122 pivoted at 123 to a post 124 on the shuttle carriage 114. The opposite end of lever 122 has a fork 125 engaging a plunger 126 urged upwardly by a spring 127. The lower end of plunger 126 has a stop member 128 and its upper end engages the outer end 129 of a clamp member 130 pivoted at 131. The member 130 forms the lower jaw of a clamp having an upper jaw member 132 slidably adjustable in position by means of screw 133 on the base member 134 to accommodate cartons of different widths.

When the cam roller 117 is elevated on land 118 or 120, the jaw or clamp member 130 operates by gravity to open position with respect to the under surface 135 of the upper jaw member 132, the outer end 129 falling by gravity onto the upper end of the retracted plunger 126. When cam roller 117 rides on the incline 136 of cam 119 or on incline 137 of cam 121, the spring 127 operates to clamp the edge of the carton between the clamp member 130 and the inner corner of surface 135 at certain times, and the spring action is removed to release the clamping action at other times, namely the clamp 130–132 is open to pick up a carton from the bottom of magazine 56, the cam roller 117 riding down incline 136 to clamp the carton and hold it clamped until the cam roller arrives at incline 137 to release the clamping action and deposit the carton in the position shown at 138 in FIG. 18 wherein the inner edge or fold line of the carton is in position against the angle block 139 in position to be engaged and held by the lower suction head device 140, the latter being actuated by cam #5 as shown in FIG. 3. On the return trip to the right, the shuttle members 130–132 are opened by arrival at cam 119 to be in position to engage and clamp the right-hand edge of the carton to hold it thus clamped for transfer to the station S1.

To accommodate cartons of different widths, the posts like 141 in FIG. 18 of the magazine 56 are adjustable, the posts like 142 on the other side of the magazine being relatively fixed.

The shuttle 67 reciprocates between a position below the magazine 56 and the station S1 to transfer the collapsed cartons 21', one at a time, from the bottom of the stack in the magazine, with the minor flaps 24 and 24' of a carton passing through the glue applicators 65 and 66, to the destination at station S1 where the carton is squared up and loaded or packed with the cup stack 20. The carton is squared up by a special device described later and is indicated generally by the reference number 70 in FIGS. 2 and 14. The dust flaps 22 and 23 are moved to closed position shown in FIG. 2 prior to the time that stack 20 reaches that end of the carton. Prior to loading the cup stack 20 into the open carton 21A in FIG. 2, the loading tray 32 with the stack 20 thereon is advanced to the open end of the carton to spread open all of its flaps to facilitate entry of the cup stack which is urged off from tray 32 by a traveling finger 68 carried by chain 69. After the cup stack has entered carton 21A in FIG. 2, the dust flaps at the outer end, where the stack 20 entered, are closed and then the minor flaps are closed, on removing the upper suction heads 71 and 72 forming a part of squaring-up device 70, the arms 73 and 74 are moved to upright position at the side of the carton to support it, the major flaps like 25 extending outwardly somewhat, the carton indicated at 21B in FIG. 2 is elevated into an upright compression chute 75, FIGS. 2 and 5, open at top 87 and bottom 88 and each side as indicated at 89. The chute 75 is adjustable lengthwise to accommodate cartons of different lengths. The chute at opposite sides has an upwardly and inwardly tapered show like 76 to close the flaps like 25 at each end as the carton is elevated. The effective width of the chute 75 is a horizontal direction is such that the cartons make a sliding fit in passing upwardly through it, to more effectively seal all of the flaps together at each end of the carton. The elevator is reciprocated so that each lower most carton of the vertical stack in the chute forces all of the other cartons in the chute upwardly, the topmost carton indicated at 21C being removed by a finger 77 on a chain 78 which operates through one cycle with one revolution of the cam shaft 41.

The chute 75, see FIGS. 2 and 5, is in the form of two upright U channels 90 and 91 each receiving one end of the cartons, but being spaced apart as indicated at 89 to receive the arms 73 and 74 when the filled and sealed container is elevated by cam #6 into the chute 75. The lower end of each of the side pieces or U channels 90 and 91 of chute 75, as shown in FIG. 18 in respect of the member 90, has mounted on the front and rear walls thereof a pivoted catch 198 and 199 urged to the position shown by springs like 200, each catch having a pivotal support like 201 and at its lower end having a head 202, the inner surface of which has a tapered surface 203 and a shoulder 204. When the upper suction head like 71 has been moved to the broken-line position shown in FIG. 18, and the carton squared up and sealed, the elevator 150, see FIG. 20, elevates the filled carton into the chute 75, acting on the tapered surfaces like 203 of the catches 198 and 199 to spread them apart against the action of the springs like 200, the elevator urging the filled carton upwardly in the chute above these catches which act as a guide for the carton. The catches return to position shown in FIG. 18 under action of spring 200 with shoulders like 204 underlying the carton to prevent it from dropping out of the chute by gravity and supporting it in position to be engaged by and urged upwardly by the next filled carton raised by the elevator.

The U channel or end support 90 is carried by suitable brackets like 92 mounted on an upright support 93 carried by the crosspiece 94 of the framework 28. The channel or end support 91 is carried by a suitable bracket 95 on a post 96 having a roller bearing 97 on crosspiece 94 and arising from a traveling nut 98 mating with the screw shaft 99 which can be operated by a handlelike 100, see FIG. 7, which is shown on the similar shaft 101 for the companion cartoning unit U2. By operating the shaft 99 or 101 the separation of the U channels 90 and 91 and associated elements including one end of the magazine, one of the transfer members and one of the squaring-up members can be adjusted to suit cartons of different lengths. Also, the chute, magazine, the shuttle, the pulldown suction cups and the elevator and squaring-mechanisms are adjustable to accommodate cartons having different sizes of cross section.

As indicated in FIG. 2, the horizontal sealed and filled carton 21C is delivered in horizontal position to a slide 79 which guides it to fall by gravity to a vertical position to the accumulator 60 where it is stacked to form a compact bundle consisting of a number of rows with the same number of cartons in each row as indicated at 80.

As shown in FIG. 16, the suction heads like 57' are preferably pivoted as indicated at 85 to permit the suction heads to swing in the direction of motion of the carton 21' while the suction is applied so as to insure that the minor flaps 24 and 24' will be pulled down below their respective tracks 63 and 64, leading to glue applicators. A spring like 86 urges the suction heads to face upwardly as shown in FIG. 16.

Power Drive

Referring to FIGS. 3 and 5, the motor 42 operates a gear reduction 143 which drives a transmission 144 which drives cam shaft 41 and cam shaft 145 at the same speed. Shaft 41 has fixed thereto the rotary cams #1 to #9, and cam #7 includes cam #18. Shaft 145 carries the rotatable cams #10 to #16 inclusive.

The reciprocating cam #17 is shown in FIG. 20, the remainder of the group #1 to #18 being shown in FIG. 3. The broken lines from each of the cams in FIG. 3 represent a suitable driving connection to the element driven thereby as indicated in that figure.

Cams #1 to #9 and #18

Cam #1 oscillates sprocket 146 which has a chain and sprocket connection 147 to reciprocate finger 68 which moves to the left to advance the cup stack into the open carton and then retreats to idle position ready to act on the next cup stack or similar article.

Cam #2 oscillates the upper suction heads 71 and 72 at station S1, to unfold or square up the carton.

Cam #3 operates the side flap tuckers 148a at the outer end of the open carton, which receives the cup stack, this mechanism being similar to that shown at 148 at the inner end of the carton, FIG. 13 showing further details of the drive for operating the side flap tuckers.

Figure 19:
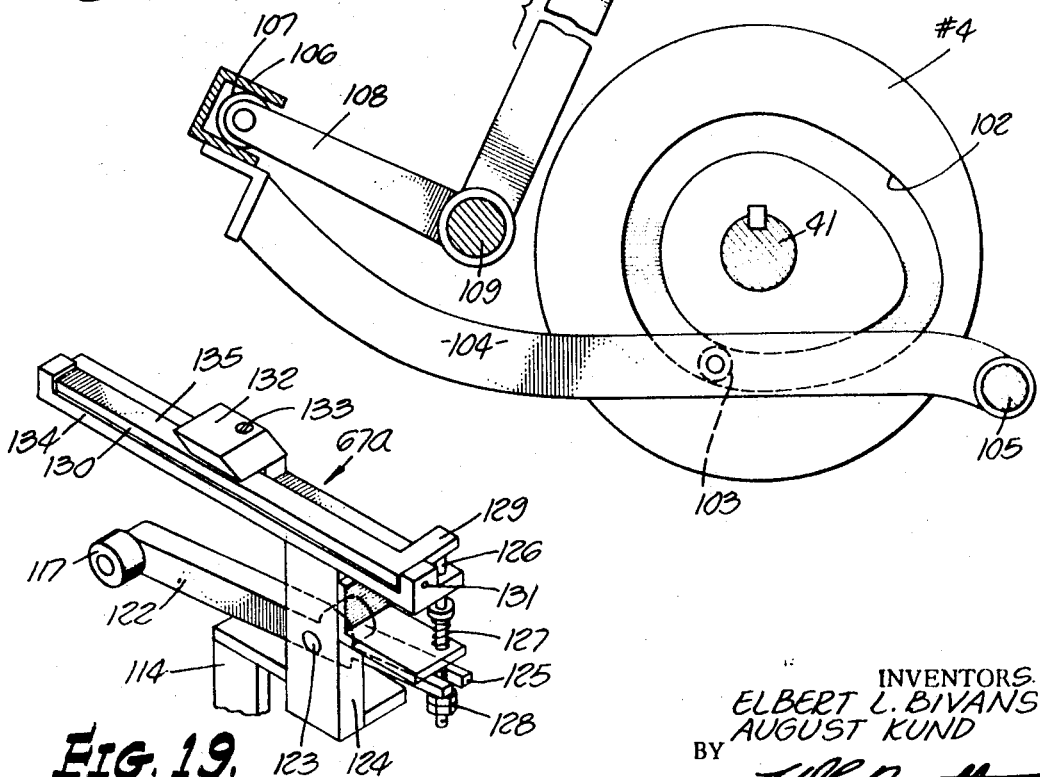
FIG. 19 is a perspective view showing a detail of the shuttle.

Cam #4 operates the shuttle 67 as shown and described in connection with FIGS. 18 and 19.

Cam #5 reciprocates the upwardly facing suction heads 57 and 58 which operate to pull down a carton from the bottom of the magazine 56.

CAM #6 raises and lowers the elevator 150 and associated parts as indicated in FIGS. 3 and 20.

Cam #7 operates the bottom or minor flap tuckers 151 and 152 at opposite ends of the carton as well as the support arms 73 and 74. Cam #7 has a cam #18 which operates a switch 156 to control valve 157 controlling a suitable source of pressure to operate the glue applicators 65 and 66.

Cam #8 operates the side flap tuckers 148.

Cam #9 operates three elements in timed relation with each other as indicated in FIG. 3, these devices being the row pusher 55 of the accumulator 60, the carton transfer arms 51 and 53 of the accumulator 60 and transfer arm 30.

Cams #10 to #16

Referring to FIG. 3, cam #10 reciprocates loading tray 32 shown in further detail in FIGS. 11 and 12 wherein the following appear. The bottom of tray 32 has a flange 158 which operates as the tray is advanced to engage a roller 159 on the outer end of a lever 160 which swings the side flap opener 154 about pivot 161, where the lever 165 is also pivoted, lever 165 having a bellcrank extension 162 to the outer end of which is pivotally connected at 163 a link 164 which operates the lever 166 having a pivot 167 on which the flap opener 155 is also pivoted. As the tray advances to engage roller 159, the side flap openers 154 and 155 swing outwardly in opposite directions to urge the side flaps 22 and 23 to open position as indicated in FIG. 11, to facilitate entry of the cup stack 20. As the cup tray 32 advances, having a travel of about 3 inches, the tray also operates the top flap opener 168 to urge the top or major flap 25 to open position as shown in FIG. 12. For this purpose, tray 32 has a post 169 having pivoted thereto at 170 a crank arm 171 pivotally connected at 172 to lever 173 having a pivot 174 on the frame not shown. Lever 173 has fixed thereto, at an angle, the top flap opener 168 which oscillates about pivot 174, being retracted when tray 32 is withdrawn, and moved clockwise as shown by arrow 175 as the tray 32 advances to the open end of the carton. As tray 32 advances, also the lug 153 urges the minor flap 24 downwardly as shown in FIG. 12, without contacting the glue strip 26 shown in FIG. 1b. The tray 32 at its outer end has a raised portion 176 extending above the bottom panel indicated at 177, in position to act as a stop and prevent the cup stack from bouncing back out of the carton following its insertion into the carton by the finger 68.

Cam #11 operates a valve 178 to control fluid pressure indicated at P to operate a cylinder 179, see FIG. 8, to control a gate 180. When the gate is open as shown at 180, this allows the cup stack 20 on the conveyor to advance to its transfer arm 30, whereas while a given stack such as 20a is being processed, the gate as shown at 180a is swung into the path of the oncoming cup stack indicated at 20b to retard its advance by the continuously operating conveyor 29 until the previous cup stack has been processed. These gates are also shown in FIG. 6. When the pressure is released from cylinder 179 or corresponding 179a, the gate is retracted by a springlike 181, the gate having a pivotal mount like 182 in FIG. 8. The gate 180 is shown in FIG. 8 as open to admit a cup stack 20. This gate is closed as shown for the twin unit 180a in FIG. 8 by cam #11 at the same time as the collapsed carton is transferred by cam #4 and the cup stack is transferred to the tray by cam #9 and the forward accumulator is operated by cam #9 to feed an upright filled carton into the row former.

Cam #12 is not shown as connected to anything, schematically representing a cam which may be used for safety purposes, for example, to stop the motor 42 if undesirable things happen such as failure of the vacuum, these safety features forming no part of the present invention.

Cam #13 operates valve 183 to control the supply of vacuum to the suction heads 57 and 58 which pull down a collapsed carton from the magazine, in timed relation with the operation of cam #5 which reciprocates these suction heads. Referring to the timing chart FIG. 4, the heavy black line L1 in each case represents the operating condition, the straight line such as L2 represents idle condition, and the open heavy line like L3 represents returning from operating condition. For example, as applied to cam #5 for magazine pickup and cam #13 for the application of vacuum to the suction heads for the carton pulldown, cam #5 is elevating the pulldown from 0° to 10° and lowering the pulldown from 10° to 50°. From 85° to 120° the pulldown is returning up, and at 350° to 360° and continuing from 0° to 10° the pulldown is being elevated an additional amount to insure firm contact with the bottom carton in the magazine. Vacuum is applied to the suction heads of the pulldown during the interval indicated on FIG. 4 and is idle the remainder of the cycle.

Cam #14 controls limit switch LS10 to open the circuit of motor 42 and stop the cycle, as shown in FIGS. 3 and 9. FIG. 9 also shows the limit switch LS1 operated by arrival of the cup stack 20 to close the circuit of motor 42 and start the cycle. The two switches LS1 and LS10 are in a parallel circuit in series with the motor. Switch LS10 is normally closed, but is held open by cam #14 from 0° to 70° as shown by the timing chart FIG. 4 so that when the cup stack 20 arrives and closes switch LS1, this completes the motor circuit to start the cycle. Switch LS1 is normally open, being closed by the advancing cups. LS1 is mounted on transfer arm 30 and moves with it and is adjustble lengthwise to accommodate cup stacks of different lengths. LS1 stays closed until 90° as shown, FIG. 4, by cup transfer of cam #9, which overlaps the normal closed condition of LS10 controlled by cam #14, to keep the motor running until opened at 0° by cam #14. LS1 returns to open position when it is released by transfer of the cup stack 20 from conveyor 29 to tray 32.

Cam #15 controls valve 184 controlling vacuum supply for suction heads 71 and 72 which are the movable suction heads for squaring up the carton.

Cam #16 controls valve 185 for controlling vacuum supply for the lower suction heads 140 which are mounted on the elevator 150 and cooperate with the suction heads 71 and 72 for squaring up the carton.

Squaring Up

The squaring-up station in FIG. 3 shows an oscillating shaft 186 which operates the upper suction heads 71 and 72. Further details of the squaring-up feature are disclosed in FIGS. 14 and 18. In FIG. 14, the shaft 186 is indicated and this carries a crank arm 187 which appears in side view in that figure. Shaft 186 has a suitable bearing not shown on the main frame of the machine. The outer end of crank 187 carries an elongated bar 188 which in turn has an arm 189 for the suction head 71 shown as having three suction cups, and a similar arm 190 for the suction head 72 also having three suction cups. The outer end of bar 188 is supported for rotation about the axis of shaft 186 which corresponds to the fold line 191 of the carton by means of a support arm 192, the edge of this arm appearing in FIG. 14 and an elevation of it appearing in FIG. 18. Arm 192 has a bearing support in the form of a roller 193 rotatably carried by the arm 192 riding in an arcuate track 194 which is concentric with the axis of shaft 186 and the fold line 191, this fold line being determined by the apex of the angle formed by the angle block 139 as shown in FIG. 18. When the shaft 186 is in one angular position, the parts are as shown in FIG. 18 with suction head 71 in position to engage the side panel of the carton at a point directly above the lower suction head 140 which engages and holds the bottom panel during the squaring,up operation. As shaft 186 rotates through 90°, it elevates the suction head 71 to square up the carton, suction head 71 and associated parts moving to the broken-line position shown in FIG. 18. A portion of the elevator 150 is shown in FIG. 18, the crosshatched portion 195 representing a bearing support for the shaft 196 which carries one of the support arms indicated at 73, a similar support being provided for the other support arm 74. Preferably the upper suction heads 71 and 72 move in circular tracks like 194 in the same direction in both of the cartoning units U1 and U2.

By arranging for the suction heads 71 and 72 to be supported as described, with the crank 187 at the inner end of the carton this frees the space around the fold line 191 at the opposite end of the carton which space is available for the side tuckers and other elements not shown in this figure, and it is this feature which makes it possible to perform both the squaring up and the loading of the article into the carton at the same station S1 instead of squaring up at one station and then conveying the squared-up carton to another station where the article is inserted. The same advantage applies in regard to flap closing as the closure of the flaps at both ends of the carton is substantially completed at station S1 instead of conveying the loaded carton to a further station to effect sealing the flaps. Shaft 186 is oscillated by cam #2, see FIG. 3, by a suitable drive indicated by the broken line 197.

Side Flap Tucker

As indicated in FIG. 3, side flap tucker 148a is operated by cam #3 and side flap tucker 148 is operated by cam #8. The mechanism for accomplishing this is shown in FIGS. 11 and 13. FIG. 11 shows the side flap tucker 148 is closed position, the tuckers being mounted on shafts 251 and 252 connected for rotation in opposite directions by the meshing pinion 253 and gear 254. The pinion 253 drives gear 254, shaft 252 having a crank arm 255 operated by a connecting rod 256 pivotally connected to a bell crank lever 257 having a pivotal support at 258 and an arm 259 pivotally connected to a link 260 for operating the oscillating lever 261 having an arm 262 having a pivotal connection 263 to a rocker arm 264. The arm 264 is indicated in FIG. 5 adjacent cam #3 at 264' and is indicated at 264" for cam #8, the side flap tucker mechanism of FIG. 13 being the same for #3 as for cam #8, but operating at different times as previously described. The shafts for 148a are mounted on a frame which is stationary with respect to the main frame of the machine, while the tucker 148 is carried by the adjustable frame including post 96 so that it will be shifted with related elements to suit cartons of different lengths.

Elevator

Prior to operating the elevator 150, the side flap tucker 148a operates under control of cam #3 to close the side flaps at the outer end of the carton, the completion of closing the side flaps at the inner end of the carton by side flap tucker 148 under control of cam #8 having been previously obtained prior to complete insertion of the cup stack in the carton.

With the carton loaded and with the side flaps at both ends thereof closed, the carton is now in condition for closing the minor or bottom flaps at both ends of the carton prior to elevating the carton into the chute 75. As shown schematically in FIG. 3 and in further detail in FIG. 20, the minor flap tuckers 151 and 152 are operated in conjunction with the support arms 73 and 74 by cam #7, as follows. As the operation is similar for both of the suction head members 140a and 140b, only one of them will be described in detail. In the position shown in FIG. 20, the reciprocating rod 205 in its upper position shown has operated tucker 152 to position closing the minor flap against the dust flaps through link 206 pivotally connected at 207 to the upper end of rod 205 and pivotally connected at 208 to the tucker 152 having a pivot 209 on the suction head member 140a. Also in the position shown, the link 210 has operated the support arm 74 to upright position at the side of the filled carton to support it, the upper suction head having been removed. The arm 74 has a pivotal support 211 on the suction head member 140a, and the arm 74 has a crank arm 212 having a pivotal support 213 with the upper end of link 210. Connecting rod 205 has suitable bearings like 214 on an extension 215 of the base 216 on which the three suction heads are mounted. Base 216 has a connecting rod 217 connected at its lower end to an arm 218 having a roller 219 which slidingly and rotatably fits in the elongated U channel member 220. This channel also contains a similar roller 221 for the rod 222, like rod 217, for the other suction head member 140b. The U channel member 220 is carried by a pair of arms 223 and 224 fixed to an oscillating shaft 225 having suitable bearings like 226. Shaft 225 is oscillated under control cam #6 which has a cam groove 227 for a cam follower 228 on the outer end of arm 229 fixed to shaft 225. The suction head members 140a and 140b are thus raised and lowered under control of cam# 6.

The operation of the arm 74 and minor flap tucker 152 is under control of cam #17 which is reciprocated by the cam #7, see FIG. 21. Cam #7 has a cam groove 230 for a cam follower 231 on oscillating arm 232 having a pivotal connection 234 at the other side of the cam with a link 235 having a pivotal connection 236 with a crank 237 having a fixed pivot 238. FIG. 20 shows the front of cam #17 while the side view in FIG. 21 shows the elements 236 to 238 at the rear of cam #17. Projecting from the rear of cam #17 is an arm 239 which carries a fork 240, and the crank 237 carries a shaft 241 which rides in the fork 240 to form a sliding pivotal connection which permits the cam #17 to assume different positions when members 140a and 140b are adjusted lengthwise to suit cartons of different lengths. The upper suction heads 71 and 72 are similarly adjustable lengthwise on their support. As shown in FIG. 20, cam #17 has a slide bearing support like 242 on a shaft 243. The shaft 243 is supported by frame members 244 and 245 which are fixed with respect to the frame of the machine as the right-hand side of this cartoning unit is relatively fixed, the left side being adjustable. Hence, the supports 246 and 247 in FIG. 20, for the support rod 243a, are carried by an adjustable frame member or post 96 which carries the left-hand chute member 91 and the left-hand bars of the magazine 56 and associated elements, post 96 being longitudinally adjustable by means of the nut and screw device 98, 99 as previously described. When cam #17 reciprocates, it controls the cam roller 248 which rides in a groove 249 to pull down the rod 205, or the roller rides on the surface 250 to urge rod 205 to the position shown. When rod 205 is in its alternate position with roller 248 in groove 249, the arm 74 is retracted to horizontal position and the tucker 152 is withdrawn to a position under the carton.

Accumulator

Figure 29:
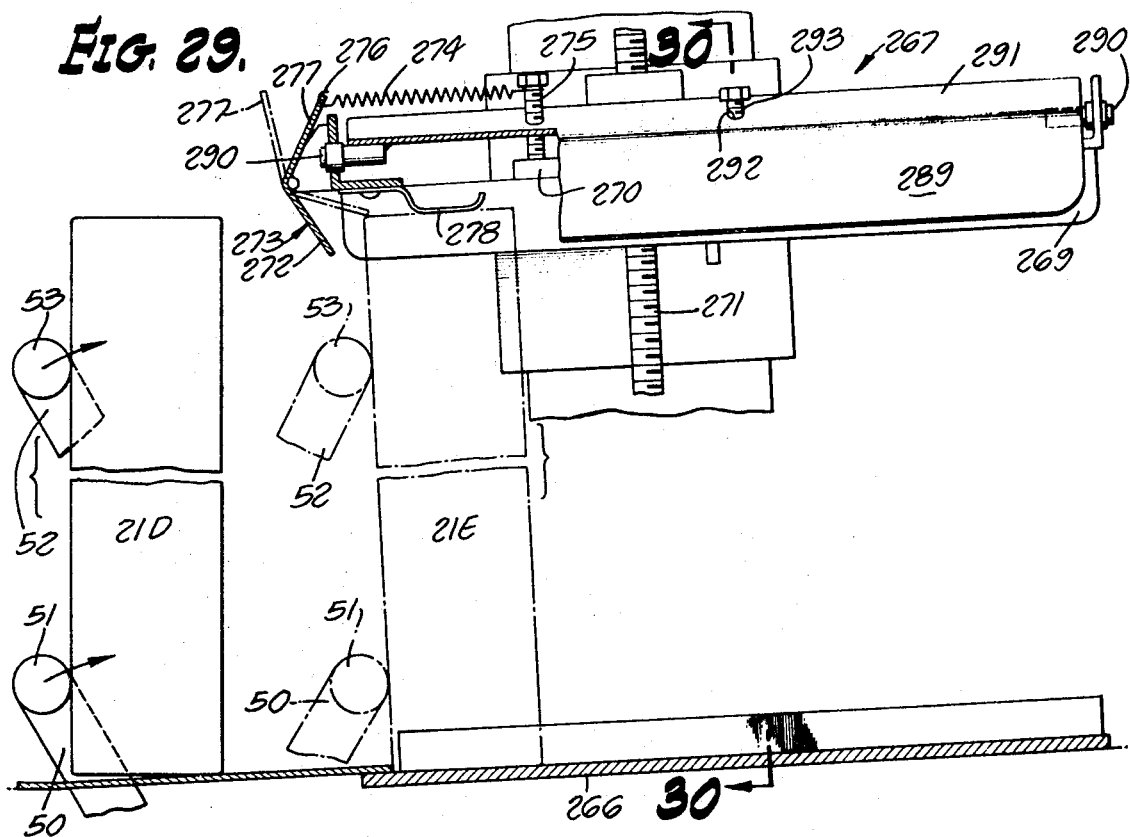
FIG. 29 is a view in elevation, partly in section, on line 29—29 of FIG. 5 of the carton retainer which admits the individual cartons to form a row, preventing them from receding.
Figure 30:
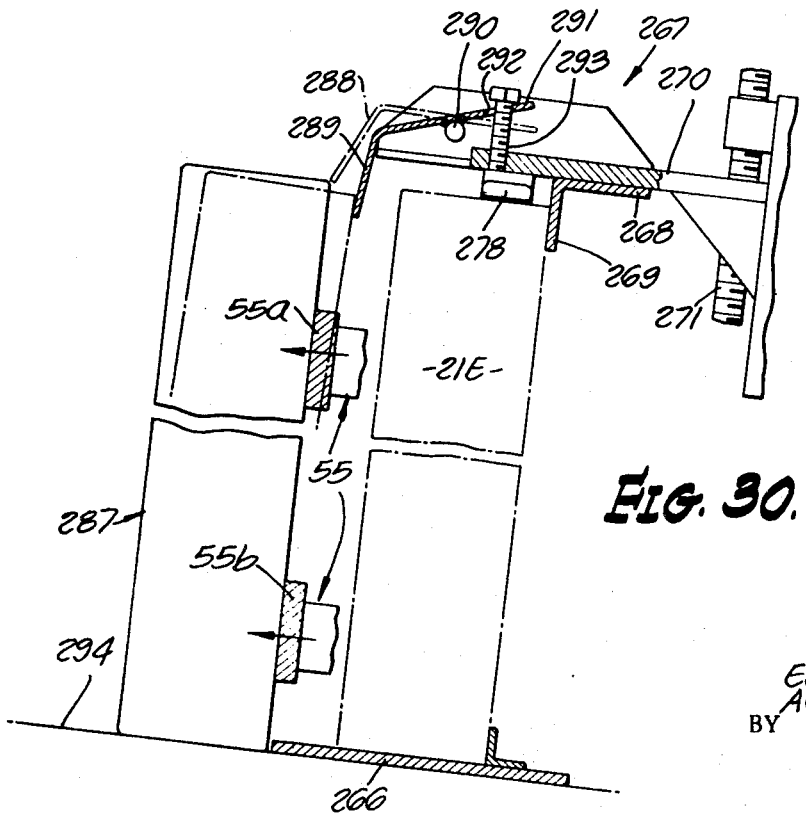
FIG. 30 is a view in elevation, partly in section, of the carton row retainer for permitting ejection of the whole row and preventing it from receding, taken on the line 30—30 of FIG. 29.

As previously described in connection with FIG. 7, one of the three functions performed by cam #9 is to rock lever arm 54 to provide power for actuating row pusher 55 of the accumulator 60, see FIGS. 2 and 3, also FIGS. 22 to 25 and 27, when a row of filled cartons has been accumulated. A row is accumulated or formed as shown in FIGS. 22 to 25, with the aid of the row former 267 shown in FIGS. 29 and 30. As shown in FIG. 2, the completed carton at the top of chute 75 is removed in horizontal position by means of the traveling finger 77, being guided to a downwardly extending slide 79 which guides the carton to fall in upright position shown at 21D in FIG. 2, in front of the spaced arms 51 and 53. The carton 21D falls on a platform 265 which leads to a platform extension 266 which slopes upwardly in an outward direction to cause the successive cartons to lean against each other in compact form. The sprocket 47 which drives arm 51 is smaller than the idle sprocket 49 whereby arm 51 travels a greater distance than arm 53 to urge carton 21D to upright position shown at 21E with respect to the platform extension 266 as shown in FIG. 29 while urging the carton to enter the row former 267. Row former 267 is in the form of an inverted U channel 268, one side 269 of which is carried by a bracket 270 supported in adjustable vertical position by means of screw 271 to adjust the height of the row former above the platform extension or base 266 to accommodate cartons of different heights. In entering the U channel, the top of carton 21E contacts the lower arm 272 of a pivoted door 273 urged to closed position shown in FIG. 29 by spring 274, one end of the spring being fixed to a post 275 and the other end being fixed at 276 to the outer end of the upper arm 277 of the door. .As the door 273 springs back to the position shown after the carton has entered the former 267, the arm 272 of the door acts as a stop to prevent the carton from sliding back out of the former 267 after the arms 51 and 53 have been withdrawn. The initial carton such as 21E, to enter the former 267, is held in the position shown under the action of a leaf spring 278, the top of the carton being held in the former 267 under the action of this spring while the base of the carton rests on the platform extension 266. Successive filled cartons are fed to one end of the former, each new one urging the previous ones, if any, in the former to advance in compact form as indicated in FIGS. 22 to 24 until the desired number of cartons has entered the row former 267. When the first carton which entered the former as indicated at 21F in FIGS. 27 and 28 contacts a trigger finger 279, it slides rod 280 against the action of spring 281 to operate cable 282 which swings the pawl 283 in FIG. 27 into position shown wherein the lever arm 284 is rocked about pivot 285 by means of a driving connection 286 with the lever arm 54 operated by cam #9, see also FIG. 7, whereby the lever arm 284 is operative to advance the row pusher 55 which has a pivotal connection at 285. When the pawl 283 is in an alternate idle position shown in FIG. 5, the lever arm 284 oscillates idly and the row pusher 55 drops by gravity to an idle position as shown in FIG. 5 in broken lines. The row pusher 55 is operative to push the entire row of cartons indicated at 287, and shown as having five cartons in a row, laterally out of the row former, against the action of a pivoted door shown at 288 in open position in FIG. 30 to permit ejection of the row of cartons. The door is shown at 289 in closed position to prevent the ejected row 287 from reentering the row former, to make room for accumulation of the next series of cartons to form a row. The door 288 is pivoted at 290 and it has a rear extension 291 having an aperture 292 to receive a suitable screw 293 having a head acting as a stop. The rows like 287 as formed are ejected on a base 294 which slopes upwardly in an outward direction for a reason explained in connection with the platform extension or base 266, namely to cause the weight of successive rows to be urged against the later rows to form a compact bundle, two rows of such a bundle being illustrated at 80 in FIG. 25. After the bundle has reached a desired size, the bundle is removed manually or otherwise as desired.

The door 273 acts as a catch to prevent the cartons from falling backwards out of the inlet or open end of the row former 267 when the oscillating arms 51 and 53 withdraw on the return stroke. The door 288 acts as a catch to prevent the row of cartons from reentering the row former 267 when the row pusher 55 withdraws due to release of the trigger 279 when the leading carton no longer engages it due to ejection of the row by the row pusher.

To summarize the operation of the accumulator, a row of upright cartons is formed by adding the next carton at one end of the desired row and employing it to push the carton or cartons ahead of it longitudinally along a linear support provided by a row former and base. When the row is full, the leading carton operates a trigger which activates a device ejecting the row laterally from the row former to empty it for the next row. The cartons are moved uphill longitudinally to form a row and moved uphill laterally to form successive rows to form a compact bundle of upright cartons.

The previous reference to bundle of cartons is to be construed as applying to a group of rows which may or may not be tied together to form a bundle, as desired.

Referring to FIG. 21, shaft 241 is fixed at its ends in the two cranks like 237 of the two spaced cams #17 and #17a. Shaft 241 extends from one of the cams, #17, to the companion cam #17a as shown in FIG. 20 in order to operate both of these cams at the same time by cam #7, FIG. 21. The fixed pivot 238 is suitably fixed to the main frame. Shaft 241 as shown in FIG. 20 is longer than the lateral separation of cams #17 and #17a for maximum desired lateral adjustment of cam #17a, the fork 240 and associated parts being slidable with respect to shaft 241.

I claim:

1. An accumulator comprising a row former for upright filled and sealed cartons, an oscillating transfer device for supplying the cartons in upright position to said row former, a rotary cam operated means for oscillating said transfer device, a row pusher for ejecting a row of cartons from said row former, a pivot supporting said row pusher for movement to idle or active position, a rotary cam operated drive, a pawl on said row pusher, means supporting said pawl for movement to idle position or to active position in the path of said drive, and a trigger device in the path of the foremost carton of a row of cartons for operating said pawl to active position when the row is full to connect said drive to said pawl to operate said row pusher to eject the row of cartons from said row former, said row pusher and pawl returning to idle position after said row is ejected to disconnect said drive from said pawl to prepare said row former for receiving the next row.

2. An accumulator comprising a row former having an inverted U channel for guiding and restraining the tops of an upright longitudinal, horizontal row of elongated filled and sealed cartons and a base for supporting the bottoms of said cartons, means for supplying said elongated upright cartons one at a time to said U-channel to form a row thereunder, and means acting when the row is full to transversely eject the row as a unit from said row former to prepare said row former for formation of the next row.

3. An accumulator comprising a row former having means for supporting an upright longitudinal row of filled and sealed cartons, means for supplying upright cartons one at a time to said supporting means, means acting when the row is full to transversely eject the row as a unit from said row former to prepare said former for formation of the next row, said row former comprising an inverted U-channel guiding and supporting the tops of a row of said upright carton, and an inclined base supporting the bottoms of said cartons to cause the cartons to move uphill longitudinally to form a row and also uphill transversely to form successive rows constituting a compact group of rows of upright cartons.

4. An accumulator comprising a row former having means for supporting an upright longitudinal row of filled and sealed cartons, means for supplying upright cartons one at a time to said supporting means, means acting when the row is full to transversely eject the row as a unit from said row former to prepare said former for formation of the next row, said row former guiding and supporting the row of said upright cartons, said row former having an inlet for the individual cartons and a lateral outlet for the row of cartons as a unit, as inclined base supporting the bottoms of said cartons to cause the cartons to move uphill longitudinally to form a row and also uphill transversely to form successive rows constituting a compact group of rows of upright cartons, said inlet having a catch preventing the cartons from emerging from said inlet, and said outlet having a catch preventing a row of the cartons from reentering said row former.

5. Accumulator according to claim 4, said row former being in the form of an inverted U-channel supporting the tops of a row of cartons, said U-channel having said inlet at one end thereof and said outlet at the side thereof, said inlet catch being in the form of a pivoted member in the path of the cartons, said outlet catch forming a pivoted side of said U-channel.

6. An accumulator according to claim 4 further including a chute, means for supplying elongated filled cartons in horizontal position longitudinally, one at a time to the top of said chute, the leading end of each horizontal carton thus supplied extending unsupported whereby the leading end of the carton drops to fall by gravity, said chute including means guiding the falling carton to assume an upright position as it drops to rest on said base.